(12) United States Patent
Mu et al.

(10) Patent No.: US 12,298,390 B2
(45) Date of Patent: May 13, 2025

(54) METHOD, DEVICE, COMPUTING EQUIPMENT, AND STORAGE MEDIUM FOR PREDICTING DRIFT VELOCITY

(71) Applicants: SHENZHEN UNIVERSITY, Shenzhen (CN); SOUTHERN MARINE SCIENCE AND ENGINEERING GUANGDONG LABORATORY (GUANGZHOU), Guangzhou (CN); SHENZHEN LANGCHENG TECHNOLOGY CO., LTD, Shenzhen (CN)

(72) Inventors: Lin Mu, Shenzhen (CN); Daosheng Wang, Shenzhen (CN); Yan Li, Shenzhen (CN); Hao Qin, Shenzhen (CN)

(73) Assignees: SHENZHEN UNIVERSITY, Shenzhen (CN); SOUTHERN MARINE SCIENCE AND ENGINEERING GUANGDONG LABORATORY (GUANGZHOU), Guangzhou (CN); SHENZHEN LANGCHENG TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/850,578

(22) PCT Filed: Apr. 28, 2023

(86) PCT No.: PCT/CN2023/091849
§ 371 (c)(1),
(2) Date: Sep. 25, 2024

(87) PCT Pub. No.: WO2023/216946
PCT Pub. Date: Nov. 16, 2023

(65) Prior Publication Data
US 2025/0110236 A1    Apr. 3, 2025

(30) Foreign Application Priority Data

May 9, 2022    (CN) .......................... 202210495718.7

(51) Int. Cl.
*G01C 15/00*    (2006.01)
*G01C 13/00*    (2006.01)
(Continued)

(52) U.S. Cl.
CPC ............ *G01S 15/58* (2013.01); *G01C 13/006* (2013.01); *G01S 7/52004* (2013.01)

(58) Field of Classification Search
CPC ................ G01C 13/004; G01C 13/006; G01C 13/002; G01C 13/00; G01C 13/008; G01C 5/06;
(Continued)

(56) References Cited

U.S. PATENT DOCUMENTS

2023/0314144 A1* 10/2023 Lee .................. G01C 21/16
701/21

FOREIGN PATENT DOCUMENTS

CN    105653826 A    6/2016
CN    109902877 A *  6/2019
(Continued)

OTHER PUBLICATIONS

Xu Jiangling, et al., Analysis of Wave Effect on Drifting Trajectory of Float at Sea, J. of Institute of Disaster Prevention, 2017, pp. 75-79, vol. 19, No. 2.
(Continued)

*Primary Examiner* — Andre J Allen
(74) *Attorney, Agent, or Firm* — Bayramoglu Law Offices LLC

(57) ABSTRACT

A method, device, computing equipment, and storage medium for predicting the drift of the floating object are provided. A method for predicting drift velocity includes:
(Continued)

obtaining environmental characteristic parameters at the location of the floating object to be predicted, wherein the environmental characteristic parameters include wave characteristic parameters; inputting the wave characteristic parameters into a deep learning model for wave-induced drift velocity to obtain the wave-induced drift velocity; wherein the deep learning model for wave-induced drift velocity is trained based on first sample drift data, wherein the first sample drift data includes observed drift velocity of sample floating objects, corresponding sample water surface flow characteristic parameters, sample wind characteristic parameters, and sample wave characteristic parameters.

20 Claims, 3 Drawing Sheets

(51) Int. Cl.
*G01S 7/52* (2006.01)
*G01S 13/06* (2006.01)
*G01S 15/58* (2006.01)

(58) Field of Classification Search
CPC .......... G01C 17/34; G01C 25/00; G01C 5/04; G01C 9/00; G01C 9/06; G01C 9/14; G01C 9/18; G01C 21/16; G01C 21/185; G01C 21/203; G01C 9/12; G01S 15/101; G01S 15/88; G01S 15/50; G01S 1/72; G01S 15/02; G01S 15/14; G01S 15/87; G01S 13/95; G01S 19/14; G01S 13/003; G01S 13/0218; G01S 13/58; G01S 13/589; G01S 13/862; G01S 13/87; G01S 13/89; G01S 13/90; G01S 13/9029; G01S 13/951; G01S 13/955; G01S 15/04; G01S 15/18; G01S 15/582; G01S 15/60; G01S 15/885; G01S 19/35; G01S 19/42; G01S 3/48; G01S 3/801; G01S 7/003; G01S 7/295; G01S 7/52006; G01S 7/529; G01S 7/534; G01S 7/539; G01S 13/422; G01S 19/13
USPC .......................................... 73/170.29–170.33
See application file for complete search history.

(56) References Cited

FOREIGN PATENT DOCUMENTS

| | | | | |
|---|---|---|---|---|
| CN | 110375720 A | | 10/2019 | |
| CN | 111159924 A | | 5/2020 | |
| CN | 111914462 A | | 11/2020 | |
| CN | 112712214 A | | 4/2021 | |
| CN | 113219466 A | | 8/2021 | |
| CN | 113393027 A | | 9/2021 | |
| CN | 114580309 A | | 6/2022 | |
| CN | 117113797 A | * | 11/2023 | |
| CN | 117195675 A | * | 12/2023 | |
| GB | 2441610 A | * | 3/2008 | ............. G01S 11/10 |
| WO | 2020180818 A1 | | 9/2020 | |
| WO | WO-2024180491 A1 | * | 9/2024 | |

OTHER PUBLICATIONS

Kui Zhua, et al., Exploration of the wind-induced drift characteristics of typical Chinese offshore fishing vessels, Applied Ocean Research, 2019, pp. 1-10, vol. 92, 101916.

* cited by examiner

METHOD, DEVICE, COMPUTING EQUIPMENT, AND STORAGE MEDIUM FOR PREDICTING DRIFT VELOCITY

CROSS REFERENCE TO THE RELATED APPLICATIONS

This application is the national phase entry of International Application No. PCT/CN2023/091849, filed on Apr. 28, 2023, which is based upon and claims priority to Chinese Patent Application No. 202210495718.7, filed on May 9, 2022, the entire contents of which are incorporated herein by reference.

TECHNICAL FIELD

The embodiment of the present disclosure relates to the field of maritime technology, particularly relates to a method, device, computing equipment, and storage medium for predicting drift velocity.

BACKGROUND

Maritime accidents can result in various floating objects at sea. For example, in the event of an oil spill at sea, oil slicks may be generated as floating objects. For another example, in the event of a maritime collision,
floating objects such as collision debris, life rafts, people overboard, and the distressed vessel itself may be produced.

In order to quickly salvage and clean up the floating objects at sea or to search and rescue related floating objects after a maritime accident, it is necessary to determine the approximate area where the floating objects are located. Predicting the drift path of the floating objects at sea is required to determine the approximate area where the floating objects are located. Due to the influence of surface winds, flows, and waves on the floating objects at sea, accurately predicting the drift path of floating objects requires the precise determination of wind-induced drift velocity, flow-induced drift velocity, and wave-induced drift velocity at each moment.

Since there is no reasonable theoretical explanation for wave-induced drift velocity and the wave-induced drift velocity has a relatively minor impact compared to flow-induced drift velocity and wind-induced drift velocity, the influence of waves is generally not considered in current predictions of the drift path of the floating objects at sea, meaning that the wave-induced drift velocity is not taken into account.

However, without considering wave-induced drift velocity, the accuracy of prediction of the drift path and the actual location of floating objects at sea decreases, and it is necessary to search for the floating objects in a wider area during salvaging and cleaning up or searching and rescuing.

SUMMARY

To address the aforementioned technical issues or at least partially resolve them, the embodiment of the present disclosure provides a method, device, computing equipment, and storage medium for predicting drift velocity.

In a first aspect, the embodiments of the present disclosure provides a method for predicting drift velocity comprises: obtaining environmental characteristic parameters at the location of floating objects to be predicted, wherein the environmental characteristic parameters include wave characteristic parameters; obtaining the wave-induced drift velocity by inputting the wave characteristic parameters into a deep learning model for wave-induced drift velocity, wherein the deep learning model for wave-induced drift velocity is trained based on a first sample drift data, which includes sample drift velocity observation value of sample floating objects and corresponding sample water surface flow characteristic parameters, sample wind characteristic parameters, and sample wave characteristic parameters.

In a second aspect, the embodiment of the present disclosure provides a training method for a deep learning model for wave-induced drift velocity, comprising: obtaining multiple groups of first sample drift data, where the first sample drift data includes sample drift velocity observation values of sample floating objects and corresponding sample environmental characteristic parameters; training the deep learning model for wave-induced drift velocity based on the first sample drift data.

In a third aspect, the embodiment of the present disclosure provides a device for predicting the drift velocity of floating objects, comprising: a characteristic parameter acquisition unit used for obtaining environmental characteristic parameters at the location of the floating object to be predicted, wherein the environmental characteristic parameters includes wave characteristic parameters; a drift velocity computation unit used for obtaining the wave-induced drift velocity by inputting the wave characteristic parameters into a deep learning model for wave-induced drift velocity; wherein the deep learning model for wave-induced drift velocity is trained based on first sample drift data, which includes sample drift velocity observation values of sample floating objects and corresponding sample water surface flow characteristic parameters, sample wind characteristic parameters, and sample wave characteristic parameters.

In the fourth aspect, the embodiment of the present disclosure provides a device for training the deep learning model for wave-induced drift velocity, comprising: a sample drift data acquisition unit used for obtaining multiple first sample drift data, wherein the first sample drift data includes sample drift velocity observation values of sample floating objects and corresponding sample environmental characteristic parameters; and a training unit used for training the deep learning model for wave-induced drift velocity based on the first sample drift data.

In a fifth aspect, the embodiment of the present disclosure provides a computing equipment, comprising a memory and a processor, wherein the memory stores a computer program, which when executed by the processor, implements the method as described previously.

In a sixth aspect, the embodiment of the present disclosure provides a computer-readable storage medium, wherein the storage medium stores a computer program, which when executed by a processor, implementing the method as described previously.

BRIEF DESCRIPTION OF THE DRAWINGS

The figures included here are incorporated into the specification and form part of this specification, demonstrating embodiments consistent with the present disclosure and used in conjunction with the specification to explain the principles of the present disclosure.

To provide a clearer explanation of the embodiments of the present disclosure or technical solutions in the prior art, a brief introduction to the figures needed in the description of the embodiments or prior art will be presented. It is

DETAILED DESCRIPTION OF THE EMBODIMENTS

Figure 1:
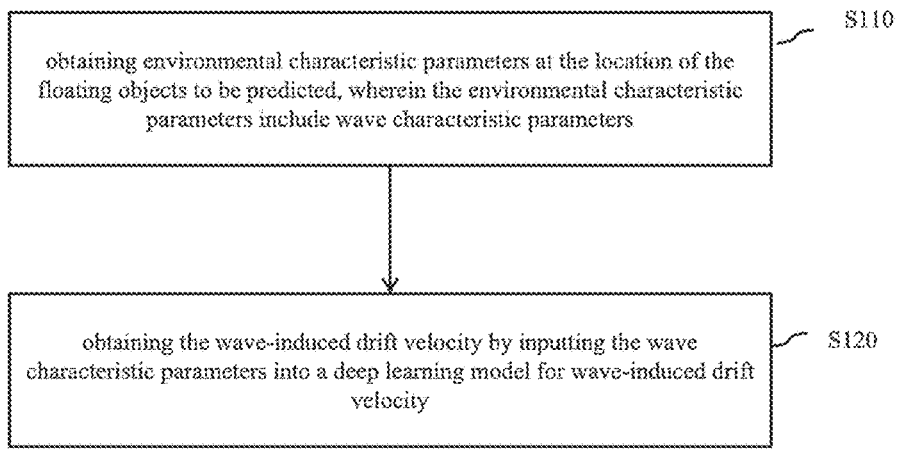
FIG. 1 shows the flowchart of method for predicting the drift velocity of the floating objects provided in some embodiments of the present disclosure.

The following will describe in more detail the disclosed embodiments with reference to the accompanying figures. While certain embodiments of the disclosure are shown in the figures, it should be understood that the disclosure can be implemented in various forms and should not be interpreted as limited to the embodiments described here. Rather, these embodiments are provided for a more thorough and comprehensive understanding of the disclosure. It should be understood that the figures and embodiments of the disclosure are for illustrative purposes only and not intended to limit the scope of protection of the disclosure.

The term "comprise" and its variations used in this document are to be construed in an open-ended manner, meaning "including but not limited to". The term "based on" is interpreted as "at least partially based on". The term "an embodiment" means "at least one embodiment"; the term "another embodiment" means "at least one additional embodiment"; the term "some embodiments" means "at least some embodiments". Definitions of other terms will be provided in the following description. It is important to note that the concepts of "first", "second", etc., mentioned in this disclosure are used to distinguish between different devices, modules, or units, and not to define the order or interdependence of functions performed by these devices, modules, or units.

It should be noted that "one", "multiple" used in this disclosure are illustrative rather than restrictive, and those skilled in the art should understand that unless otherwise explicitly stated in context, they should be understood as "one or more".

The disclosed embodiment provides a method for predicting the drift of floating objects, used to predict the drift velocity of floating objects on water. In practical applications, the drift prediction method provided by the disclosed embodiments can be applied in the maritime field to predict the drift velocity and drift path of floating objects at sea. Additionally, the drift prediction method provided by the disclosed embodiments can also be applied to predict the drift velocity and drift path of floating objects in inland rivers and lakes.

The drift velocity prediction method for the floating objects provided in the embodiments of the present disclosure not only calculates the water surface flow-induced drift velocity based on water surface flow characteristic parameters and the wind-induced drift velocity based on wind characteristic parameters, but also processes wave characteristic parameters using a deep learning model for wave-induced drift velocity to obtain the wave-induced drift velocity. Since the drift velocity of the floating object to be predicted is caused by a combination of flow, wind, and waves, it can predict the drift velocity of the floating objects to be predicted more accurately and therefor predict the drift path of the floating objects to be predicted more accurately by predicting the wave-induced drift velocity using the method for predicting drift velocity of the floating objects provided in the embodiment of the present disclosure. Based on more accurate predictions of the drift path of the floating object to be predicted, the water area where the floating objects to be predicted is located can be more accurately predicted, thereby reducing the search area range for the floating objects to be predicted.

FIG. 1 shows the flowchart of the method for predicting the drift velocity of the floating objects provided in the embodiment of the present disclosure. As shown in FIG. 1, the method for predicting the drift velocity of the floating objects provided in the embodiment of the present disclosure may include steps S110-S120.

It should be noted that the method for predicting the drift velocity of the floating objects provided in the embodiment of the present disclosure is executed by a computing equipment. The computing equipment can be a server dedicated to data processing, or computing equipment, such as laptops, shipboard terminals, personal digital assistants (PDAs), wearable devices for rescue personnel, etc.

Steps S110: obtaining environmental characteristic parameters at the location of the floating objects to be predicted, wherein the environmental characteristic parameters include wave characteristic parameters.

In the embodiments of the present disclosure, the floating object to be predicted may be floating objects floating on the water and drifting with the water flow, wind, and waves. For example, the floating object may be an oil slick from a maritime oil spill incident, a life raft from a maritime distress situation, persons in distress to be rescued, floating equipment to be salvaged, or a wrecked ships to be rescued, etc.

It should be noted that in a specific application, when predicting the drift of a particular type of floating object, it should be based on historical data of the particular type of floating objects, or historical data of the floating objects with similar drift characteristics to the particular type of the floating objects.

In the embodiments of the present disclosure, the location of the floating objects to be predicted can be an actual location or a possible location predicted based on historical data. For example, in the event of an oil spill accident on an offshore drilling rig, the location of the floating objects could be where the offshore drilling rig is located. For another example, when the floating object has drifted away from the accident area and the actual location cannot be accurately determined, the location of the floating objects can be a location predicted based on historical data.

The environmental characteristic parameters at the location of the floating objects can be actual environmental parameters at the location or environmental parameters obtained based on historical data and actual meteorological and oceanographic data. For example, if the floating objects to be predicted are floating objects in a offshore area and there are numerous floating observation stations and other monitoring devices in the offshore area, the environmental characteristic parameters can be actual data observed. For example, the environmental characteristic parameters can be relatively accurate predicted data obtained through simulations of meteorological and oceanographic conditions.

In the embodiments of the present disclosure, the environmental characteristic parameters include wave characteristic parameters.

The wave characteristic parameters are parameters used to characterize the surface wave features of the water body. The wave characteristic parameters may include at least one of wave height, wave period, and wave direction.

Steps S120: obtaining the wave-induced drift velocity by inputting the wave characteristic parameters into a deep learning model for wave-induced drift velocity.

The deep learning model for wave-induced drift velocity is a deep learning model used to predict wave-induced drift velocity based on wave characteristic parameters. In the embodiments of the present disclosure, the deep learning model for wave-induced drift velocity is trained based on the first sample drift data. The first sample drift data includes sample drift velocity observation values of sample floating objects, corresponding sample water surface flow characteristic parameters, sample wind characteristic parameters, and sample wave characteristic parameters. In order to make the description of the disclosure more concise, the training method of the deep learning model for wave-induced drift velocity will be further described later.

The method for predicting the drift of the floating objects provided in the embodiments of the present disclosure not only calculates the drift velocity induced by water surface flow based on water surface flow characteristic parameters and the drift velocity induced by wind based on wind characteristic parameters, but also obtains the drift velocity induced by waves by processing the wave characteristic parameters using a deep learning model for wave-induced drift velocity.

Since the drift velocity of the floating object to be predicted is caused by a combination of flow, wind, and waves, it can predict the drift velocity of the floating objects to be predicted more accurately and therefor predict the drift path of the floating objects to be predicted more accurately by predicting the wave-induced drift velocity using the method for predicting drift velocity of the floating objects provided in the embodiment of the present disclosure. Based on more accurate predictions of the drift path of the floating object to be predicted, the water area where the floating objects to be predicted is located can be more accurately predicted, thereby reducing the search area range for the floating objects to be predicted.

Alternatively, in some embodiments of the present disclosure, in addition to the wave characteristic parameters, environmental characteristic parameters can also include water surface flow characteristic parameters and wind characteristic parameters. The method for predicting drift velocity may include steps S110-S120 as mentioned above, as well as steps S130-S140.

Step S130: calculating the flow-induced drift velocity based on the water surface flow characteristic parameters, and calculating wind-induced drift velocity based on the wind characteristic parameters.

The water surface flow characteristic parameters are parameters that characterize the flow characteristics of water surface flow. The water surface flow characteristic parameters may include the velocity and direction of water surface flow.

The flow-induced drift velocity is the drift velocity of floating objects to be predicted acquired due to the action of water surface flow on the floating objects to be predicted. The direction of flow-induced drift velocity is the same as the direction of water surface flow, and the magnitude of flow-induced drift velocity is proportional to the velocity of water surface flow.

In some embodiments of the present disclosure, the flow-induced drift velocity can be calculated by a computing device using predetermined flow-induced drift coefficients and the water surface flow velocity. Specifically, the flow-induced drift velocity $\vec{V}_{F-surface-current}$, can be obtained using $\vec{V}_{F-surface-current} = \lambda_c \cdot \vec{V}_c$, where $\lambda_c$ is a first flow-induced drift coefficient and $\vec{V}_c$ is the water surface flow. The first flow-induced drift coefficient $\lambda_c$ is determined according to the characteristics of the floating objects and the flow characteristics of the water area where it is located. One method for determining the first flow-induced drift coefficient may be described in the following description, where the first flow-induced drift coefficient is determined during the training of deep learning model for wave-induced drift velocity.

The wind characteristic parameters are parameters that characterize the wind characteristics above water surface. The wind characteristic parameters may include the wind velocity and wind direction. In specific applications, the wind characteristic parameters can be characterized by the wind velocity and the wind direction at a height of 10 meters above the water surface.

The wind-induced drift velocity is the drift velocity of the floating objects obtained due to the action of wind on the floating object to be predicted. The wind-induced drift velocity can be calculated based on the first wind-induced drift coefficients and wind characteristic parameters. The wind-induced drift velocity includes the wind-induced drift velocity along the wind direction and the wind-induced drift velocity perpendicular to the wind direction. The calculating wind-induced drift velocity based on the wind characteristic parameters includes the calculating the wind-induced drift velocity along the wind direction and the wind-induced drift velocity perpendicular to the wind direction. The corresponding first wind-induced drift coefficient includes the wind-induced drift coefficient along the wind direction and the wind-induced drift coefficient perpendicular to the wind direction. The first wind-induced drift coefficient is determined based on the characteristics of the floating objects and the wind characteristics of the water area. One method for determining the first wind-induced drift coefficient may be described in the following description, where the first wind-induced drift coefficient is determined during the training of deep learning model for wave-induced drift velocity.

In order to calculate the wind-induced drift velocity more accurate, in the embodiments of the present disclosure, the computing equipment can also determine the predicted wind-induced drift deflection of the floating object to be predicted before performing the aforementioned step S130, and select the corresponding first wind-induced drift coefficient based on the predicted wind-induced drift deflection. The predicted wind-induced drift deflection is the deflection of the wind-induced drift direction of the floating object to be predicted relative to the wind direction.

Alternatively, in some embodiments of the present disclosure, the predicted wind-induced drift deflection of the floating object can be predicted using the following steps: based on environmental characteristic parameters, determining the predicted wind-induced drift deflection of the floating object to be predicted.

In other words, the computing equipment can determine the predicted wind-induced drift deflection of the floating object to be predicted based on the water surface flow characteristic parameters, wind characteristic parameters, and wave characteristic parameters at the location of the floating object to be predicted.

In some specific embodiments, predicting wind-induced drift deflection based on environmental characteristic parameters at the location of the floating object to be predicted can be achieved by inputting the environmental characteristic parameters into a deep learning model for wind-induced drift deflection, to determine the predicted wind-induced drift deflection of the floating object.

The deep learning model for wind-induced drift deflection aforementioned is trained based on the second sample drift data. The second sample drift data includes wind-induced drift deflection observation values of sample floating objects, corresponding sample water surface flow characteristic parameters, sample wind characteristic parameters, and sample wave characteristic parameters.

For example, in specific applications, various types of floating objects can be sampled to carry drift experiments in specific water environments. It may use tracking observation ships and locating buoys to track the drift trajectories of the floating objects, and obtain the corresponding sample water surface flow characteristic parameters, sample wind characteristic parameters, and sample wave characteristic parameters using equipment carried on the tracking observation ships, such as acoustic Doppler current profilers, meteorological sensors, and wave sensors.

After obtaining a large amount of data from the drift experiments of sample floating objects, the drift deflection observation values of the sample floating objects can be determined through analysis of the drift experiment data. In specific applications, the wind-induced drift velocity of the sample floating objects can be roughly determined by subtracting the water surface flow velocity from the sample drift velocity observation values; and then, the wind-induced drift deflection observation values of the sample floating objects can be determined using the wind-induced drift velocity direction and wind direction. Then, the second sample drift data can be constructed by using the wind-induced drift deflection observation values of the sample floating objects, the corresponding water surface flow characteristic parameters, the wind characteristic parameters, and the wave characteristic parameters.

After obtaining the second sample drift data, the second sample drift data can be used to train a pre-constructed deep learning model for the wind-induced drift deflection to obtain a trained deep learning model for the wind-induced drift deflection. In the embodiments of the present disclosure, the deep learning model for the wind-induced drift deflection can be any possible model, such as the BP neural network model used widely or other neural network models.

After determining the wind-induced drift deflection of the floating objects to be predicted using the deep learning model for wave-induced drift velocity, calculating the wind-induced drift velocity based on the wind characteristic parameters in the Step 130 may specifically be calculating the wind-induced drift velocity of the floating objects to be predicted based on the wind characteristic parameters and the first wind-induced drift coefficient.

In some embodiments of the present disclosure, calculating the wind-induced drift velocity of the floating objects to be predicted based on the wind characteristic parameters and the first wind-induced drift coefficient specifically includes calculating the wind-induced drift velocity along the wind direction.

It can be determined that the wind-induced drift velocity along the wind direction is proportional to the wind velocity based on the analysis of experimental data. Therefore, the wind-induced drift velocity along the wind direction can be calculated based on predetermined fitting coefficients and the wind velocity.

In some embodiments of the present disclosure, the wind-induced drift velocity along the wind direction $\vec{L}_d$ can be obtained, by the computing equipment, using $\vec{L}_d = a_d W_{10mwind} + b_d$, wherein $a_d$ and $b_d$ are the wind-induced drift coefficients along the wind direction, and $W_{10mwind}$ is the wind velocity at a height of 10 meters above the water surface.

In some other embodiments, the wind-induced drift velocity along the wind direction $\vec{L}_d$ can be obtained, by the computing equipment, using $\vec{L}_d = a_d W_{10mwind} + (b_d + \varepsilon_d)$, where $\varepsilon_d$ is the wind-induced random fluctuation coefficient along the wind direction. By introducing the downwind wind-induced random fluctuation coefficient, it may be more accurately simulate the stochastic nature of the actual wind-induced drift velocity along the wind direction.

It can be determined that the wind-induced drift velocity perpendicular to the wind direction is also directly proportional to the wind velocity based on the analysis of the experimental data. Therefore, the wind-induced drift velocity perpendicular to the wind direction can be calculated based on predetermined fitting coefficients and the wind velocity.

In some embodiments of the present disclosure, the wind-induced drift velocity perpendicular to the wind direction $\vec{L}_c$ can be obtained, by the computing equipment, using $$\begin{cases} \vec{L}_c = \delta \vec{L}_{c+} + (1-\delta)\vec{L}_{c-} \\ \vec{L}_{c+} = a_{c+} W_{10mwind} + b_{c+} \\ \vec{L}_{c-} = a_{c-} W_{10mwind} + b_{c-} \end{cases}$$

where $a_{c+}$, $b_{c+}$, $a_{c-}$, and $b_{c-}$ are fitting coefficients, and $W_{10mwind}$ is the wind velocity at a height of 10 meters above the water surface. $\delta$ is the predicted wind-induced drift deflection and is equal to 0 or 1. When $\delta$ is set to 1, it indicates that the predicted wind-induced drift deflection is skewed to the left perpendicular to the wind direction, while a value of 0 indicates that the predicted wind-induced drift deflection is skewed to the right perpendicular to the wind direction.

In some other embodiments, the wind-induced drift velocity perpendicular to the wind direction $\vec{L}_c$ can be obtained, by the computing equipment, using $$\begin{cases} \vec{L}_c = \delta \vec{L}_{c+} + (1-\delta)\vec{L}_{c-} \\ \vec{L}_{c+} = a_{c+} W_{10mwind} + (b_{c+} + \varepsilon_{c+}) \\ \vec{L}_{c-} = a_{c-} W_{10mwind} + (b_{c-} + \varepsilon_{c-}) \end{cases}$$

where $\varepsilon_{c+}$ and $\varepsilon_{c-}$ are the wind-induced random fluctuation coefficient in left and right perpendicular to the wind direction, respectively. By introducing the wind-induced random fluctuation coefficient perpendicular to the wind direction, it may be more accurately simulate the stochastic nature of the actual wind-induced drift velocity perpendicular to the wind direction.

Step S140: calculating the predicted drift velocity of the floating objects to be predicted based on the flow-induced drift velocity, wind-induced drift velocity, and wave-induced drift velocity.

In the embodiments of the present disclosure, the computing equipment can calculate the predicted drift velocity of the floating object to be predicted by summing the flow-induced drift velocity, wind-induced drift velocity, and wave-induced drift velocity.

In some embodiments of the present disclosure, the prediction of the drift velocity of floating objects to be predicted is in a case that the environmental characteristic parameters of the location at which the floating objects are located are unknown. In the case, the method for predicting drift velocity may include steps S150 and S160, in addition to the aforementioned steps S110-S140.

Step S150: determining a sea condition simulation model based on observed sea condition data.

A sea condition simulation model is a model used to simulate the sea conditions in a predicted maritime area. The sea condition simulation model includes hydrodynamic sub-models, atmospheric dynamic sub-models, and wave sub-models, all of which are constructed based on wind-wave-current coupling.

The atmospheric dynamic sub-model may be a model constructed using the WRF (Weather Research and Forecasting), the hydrodynamic sub-model may be a model constructed based on the FVCOM (Finite-Volume Coastal Ocean Model) or ROMS (Regional Ocean Modeling System), and the wave sub-model may be a model constructed based on SWAN (Simulating Waves Nearshore) or WaveWatch (WAVE-height, Water Depth and Current Hindcasting).

In order to construct the sea condition simulation model, the observed sea condition data described above includes observed atmospheric characteristic parameters, observed wave characteristic parameters, and observed water flow characteristic parameters.

In some embodiments of the present disclosure, it can determine the sea condition simulation model, by using various data assimilation methods, based on the observed sea conditions data.

In the embodiments of the present disclosure, the sea condition simulation model may be optimized using a cyclic three-dimensional variational method. Specifically, the method for optimizing the sea condition simulation model using a three-dimensional variational assimilation method may include steps S210-S250.

Step S210: dividing the assimilation window to obtain N sub-assimilation windows, each of which includes observed sea condition parameters.

In the embodiments of the present disclosure, the assimilation window is a time window that includes the observed sea condition data.

In the embodiments of the present disclosure, the computing equipment may obtain N sub-assimilation windows by performing sliding windows division of the assimilation window based on pre-determined N sub-assimilation windows. Among the N sub-assimilation windows, adjacent windows may or may not have time overlaps, with no specific limitations imposed in the embodiments of the present disclosure.

In other embodiments of the present disclosure, the computing equipment may also use a random division method to divide the assimilation window into N sub-assimilation windows.

It should be noted that each sub-assimilation window should include the observed sea condition data. In practical applications, if a sub-assimilation window lacks the sea condition observation parameters, it can be merged with adjacent sub-assimilation windows.

Step S220: obtaining the initial sea simulation state of the i-th assimilation window by assimilating the observed sea condition parameters of the i-th assimilation window using a three-dimensional variational assimilation method.

In the embodiments of the present disclosure, i=0, 1, 2, . . . , N−1. In specific implementation, the computing equipment first sets i to 0, and starts from the $0^{th}$ sub-assimilation window to assimilate the observed sea condition parameters included in the sub-assimilation window using the three-dimensional variational assimilation method to obtain the initial sea simulation state of the 0th sub-assimilation window. Similarly, for each subsequent assimilation window, it can use the three-dimensional variational method to assimilate the observed sea condition data included in the current assimilation window to obtain the initial sea simulation state.

When performing three-dimensional variational assimilation for a specific assimilation window, the computing equipment minimizes the objective function corresponding to the specific assimilation window to modify the sea condition simulation model and obtain the modified model. The objective functions are defined as follows:

$$J = J_B + J_O, J_B = \frac{1}{2}(x_b - x)^T B^{-1}(x_b - x),$$

$$J_o = \frac{1}{2}[H(x) - y_o]^T O^{-1}[H(x) - y_o],$$

where x is the predicted parameter matrix constructed based on the predicted parameters determined by the sea condition simulation model before modification, $x_b$ is the background parameter matrix constructed based on the predicted sea condition parameters, B is the background error covariance matrix, O is the observational error covariance matrix, $y_o$ is the observational parameter matrix constructed based on the observed sea condition parameters, and H is the observational operator.

Step S230: Performing numerical simulation based on the sea condition simulation state at the beginning of the i-th assimilation sub-window to obtain the sea condition simulation state at the beginning of the i+1 assimilation sub-window.

After obtaining the sea condition simulation state at the beginning of the i-th assimilation sub-window, it can obtain the sea condition simulation state at the beginning of the i+1 assimilation sub-window by performing numerical simulation based on the sea condition simulation model. In practical applications, if there is an overlap between the i-th assimilation sub-window and the i+1 assimilation sub-window, the numerical simulation should be performed until the starting time of the overlap to obtain the sea condition simulation state at the beginning of the i+1 assimilation sub-window. However, if there is no overlap between the i-th assimilation sub-window and the i+1 assimilation sub-window, it is necessary to continue the numerical simulation of the beginning of the i+1 assimilation sub-window after completing the simulation in the i-th assimilation sub-window in order to obtain the sea condition simulation state at the beginning of the i+1 assimilation sub-window.

Step S240: determining whether i is less than N−1; based on that i is not less than N−1, performing step S250; based on that i is less than N−1, set i=i+1 and repeat steps S220-S230.

Step S250: calculating the sea condition state at the end of the N−1 assimilation window as the corrected sea condition simulation state.

By following steps S210 to S250 as described above, N sub-assimilation windows are obtained by dividing the assimilation window. The sea condition simulation state is corrected based on observed sea condition parameters in each of the N sub-assimilation windows, gradually correcting the sea condition simulation model. Due to use the N sub-assimilation windows to correct gradually, the sea condition simulation states within each window may be more match with the observed sea condition data characteristics, and result in more accurate corrected sea condition simulation states. Additionally, using the assimilation method provided in the disclosure may eliminate the spin-up phenomenon effectively.

In some embodiments of the present disclosure, the high-efficiency ensemble Kalman filter method can be used to optimize sea condition simulation models. The high-efficiency ensemble Kalman filter method considers the ensemble state vector of the background error covariance estimated from single-model operational results and climatological data, and perform data assimilation.

Specifically, within the current assimilation window $(T_j^{obs}, T_{j+1}^{obs})$, N time instants $t_1, t_2, t_3, \ldots, t_N$ are randomly selected to obtain ensemble model state fields $M_1$ (at time $t_1$), $M_2, M_3, \ldots, M_N$ (at time $t_N$), and extract corresponding climatological data $C_1$ (at time $t_1$), $C_2, C_3, \ldots, C_N$ (at time $t_N$). The time intervals $\Delta t_n = t_n - T_j^{obs}$, n=1, 2, 3, ..., N, and state differences $\Delta M_n = M_n - C_n$, n=1, 2, 3, ..., N, are calculated sequentially. The weighted average of N state differences is $$\overline{\Delta M} = \sum_{n=1}^{N} \frac{\Delta t_n}{T_{j+1}^{obs} - T_j^{obs}} \Delta M_n,$$

and the N perturbation matrices are $P_n = K(\Delta M_n - \overline{\Delta M})$, wherein K is the weight coefficient. Then, the ensemble matrix at assimilation time $T_{j+1}^{obs}$ is $A_{j+1} + P_n$, n=1, 2, 3, ..., N, where $A_{j+1}$ is the model state field at time $T_{j+1}^{obs}$.

Then, the ensemble Kalman filter assimilation method is used for data assimilation. Specifically, the data assimilation is performed using $A_{j+1,n}^a = (A_{j+1} + P_n) + P_n P_n^T H^T (H P_n P_n^T H^T + R_{j+1})^{-1} [O_{j+1} - H(A_{j+1} + P_n)]$, n=1, 2, 3, ..., N, where $A_{j+1,n}^a$ is the ensemble analysis (state) matrix, $O_{j+1}$ and $R_{j+1}$ are the observation matrix and observation error covariance matrix at time $T_{j+1}^{obs}$, and H is the observation transformation matrix which interpolates simulated sea condition parameters to the locations where the observed sea condition parameters are obtained.

In the embodiments of the present disclosure, an adaptive optimal interpolation assimilation method can be used to optimize sea condition simulation models. Specifically, the use of the adaptive optimal interpolation assimilation method may comprise steps S310-S360.

Step S310: based on the uncorrected sea condition simulation model, calculating the predicted sea condition parameters at each point to be predicted at the j-th observation time within the assimilation window, where j=1, 2, ..., M, and M is the number of observation time points included in the assimilation window.

Step S320: obtaining the observed sea condition parameters at each observation point at the j-th observation time within the assimilation window, and determining the observed sea condition parameters of the preset number of observation points closest to the point to be predicted.

In the embodiments of the present disclosure, the computing equipment can use an adaptive query method to determine the closest observation points with a preset number and obtain the observed sea condition parameters of the preset number of observation points at the corresponding time. Specifically, the computing equipment can determine the closest observation points with the preset number by setting a virtual circle, gradually expanding the radius of the virtual circle and searching.

Step S330: based on the predicted sea condition parameters of each point to be predicted and the observed sea condition parameters of the closest observation points with the preset number, calculating the forecast error covariance matrix, observation error covariance matrix, and analysis error covariance matrix.

Step S340: calculating the weight matrix based on the forecast error covariance matrix and the observation error covariance matrix.

Step S350: using the predicted sea condition parameters, observed sea condition parameters, and weight matrix, calculating the corrected sea condition simulation state at the j-th observation time.

In the embodiments of the present disclosure, after obtaining the forecast error covariance matrix $P_b$, observation error covariance matrix R, and observation operator H, the weight matrix can be obtained using $K = P^b H^T (H P^b H^T + R)^{-1}$. And then $X^a - X^b = K(Y^o - HX^b)$ may be obtained, where $X_b$ is the sea condition predicted state and $X_a$ is the corrected sea condition predicted state.

Step S360: determining whether j is less than M, based on that j is less than M, set j=j+1, and re-executing steps S320-S350; based on that j is not less than M, performing step S370.

Step S370: after obtaining the simulated sea conditions at the last observation time, obtaining the optimized sea condition simulation model.

Once the optimized sea condition simulation model is determined, performing the step S160.

Step S160: performing numerical simulation based on the optimized sea condition simulation model and determining the environmental characteristic parameters at the location and time of the floating object to be predicted.

performing numerical simulation based on the optimized sea condition simulation model and determining the environmental characteristic parameters at the location and time of the floating object to be predicted comprises determining the environmental characteristic parameters of each grid point of unstructured grid in a specific marine area at a predefined time period using numerical simulation.

Specifically, the environmental characteristic parameters at the location of the floating object to be predicted are determined based on the current location of the floating object to be predicted. It can comprise querying the unstructured grid of sea conditions simulated based on the sea condition simulation model at the current time, determining the closest target grid points with the preset number from the current location, and determining the environmental characteristic parameters at the current time based on the location coordinates and environmental characteristic parameters of the target grid points, and the location coordinates of the current location. Wherein the current location can be calculated based on the initial drift location of the floating object to be predicted and the predicted drift trajectory of the floating object up to the current time.

In a specific embodiment, the grid points in the unstructured grid can be stored using a quadtree storage manner. Determining the environmental characteristic parameters at the drift location of the floating object to be predicted can comprises searching along the quadtree and finding the environmental characteristic parameters of adjacent grid points by using the current location of the floating object to be predicted. After determining the environmental characteristic parameters of the adjacent grid points, the environmental characteristic parameters of the adjacent grid points can be used for weighted averaging to obtain the environmental characteristic parameters at the drift location. The weights in the aforementioned weighted averaging are inversely proportional to the distance from the adjacent grid points to the drift location.

In the embodiments of the present disclosure, after determining the environmental characteristic parameters at the current location of the floating object and determining the drift velocity at the current time based on the environmental characteristic parameters at the current location, it can determine the predicted drift location for the next time interval by performing an integral operation based on the drift velocity and a predetermined time interval, and predicting the next predicted drift location at the next time interval based on the next predicted drift location at the next time interval. A predicted drift trajectory for the floating object to be predicted can be predicted through the cycle operation of the process described above.

In some embodiments of the present disclosure, after determining the environmental characteristic parameters at the current location of the floating object to be predicted, multiple random perturbations can be added to the environmental characteristic parameters to calculate multiple drift velocities. Based on the multiple drift velocities, multiple predicted drift locations for the next time interval are calculated, and the corresponding predicted drift velocities are recalculated based on the multiple predicted drift locations for the next time interval. Multiple predicted drift trajectories for the floating object to be predicted can be determined through cycle operation of the process described above. After determining the multiple drift trajectories of the floating object to be predicted, the overall drift location of the floating object to be predicted can be predicted using the multiple drift trajectories of the floating object to be predicted. Specifically, the convex hull algorithm can be used to determine the overall drift location of the floating object to be predicted based on multiple drift trajectories.

In the embodiments of the present disclosure, in addition to determining multiple drift trajectories by adding perturbations to environmental characteristic parameters, multiple wind-induced drift coefficients and flow-induced drift coefficients may be determined by adding random perturbations to the first wind-induced drift coefficients and the first flow-induced drift coefficients. And multiple predicted drift velocities may be calculated based on the multiple wind-induced drift coefficients and flow-induced drift coefficients. And then multiple predicted drift trajectories may be obtained by cycle integral operation of the predicted drift velocities.

In addition to the aforementioned method for predicting drift velocities of floating objects, the embodiments of the present disclosure also provide a method for training a deep learning model for wave-induced drift velocity in the method for predicting drift velocities described above.

Figure 2:
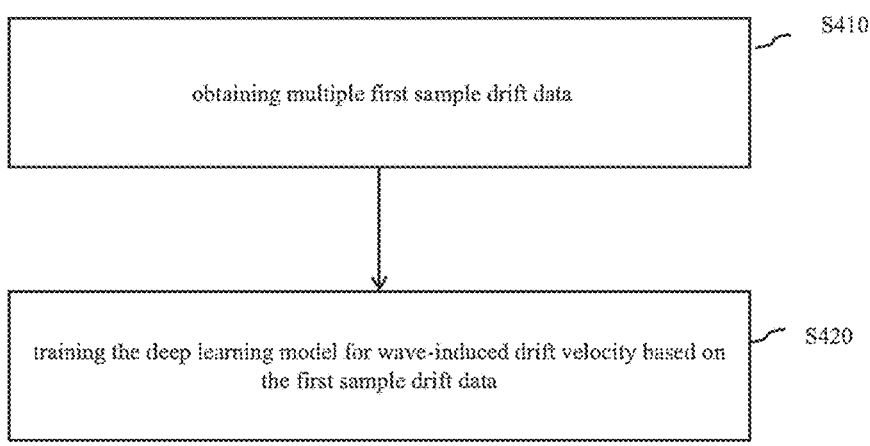
FIG. 2 shows the training method flowchart for the deep learning model for wave-induced drift velocity provided in some embodiments of the present disclosure.

FIG. 2 illustrates a flowchart of a method for training a deep learning model for wave-induced drift velocity in the embodiments of the present disclosure. The method for training a deep learning model for wave-induced drift velocity shown in FIG. 2 includes steps S410-S420.

Step S410: Obtaining multiple first sample drift data.

The first sample drift data is the training data used for training the deep learning model for wave-induced drift velocity. Each first sample drift data includes sample drift velocity observation values of sample drift objects, corresponding sample water surface flow characteristic parameters, sample wind characteristic parameters, and sample wave characteristic parameters.

The sample drift objects can be drift objects of various types, such as oil films, life rafts, personnel awaiting rescue, floating equipment awaiting salvage, distressed vessels awaiting rescue, etc.

In specific applications, sample drift objects can be used to perform drift experiments in specific water environments, and drift trajectories of the sample drift objects can be tracked using tracking observation ships, positioning buoys, etc. Simultaneously, corresponding sample water surface flow characteristic parameters, sample wind characteristic parameters and sample wave characteristic parameters can be obtained using equipment such as acoustic Doppler current profilers, meteorological sensors, wave sensors, etc., carried on the tracking observation ships.

Step S420: Training the deep learning model for wave-induced drift velocity based on the first sample drift data.

After obtaining the first sample drift data, the computing equipment can train the pre-designed deep learning model for wave-induced drift velocity using the first sample drift data to obtain a trained deep learning model for wave-induced drift velocity.

In the embodiments of the present disclosure, the deep learning model for wave-induced drift velocity can refer to various possible models, such as neural network models widely used, for example, the BP neural network model.

Figure 3:
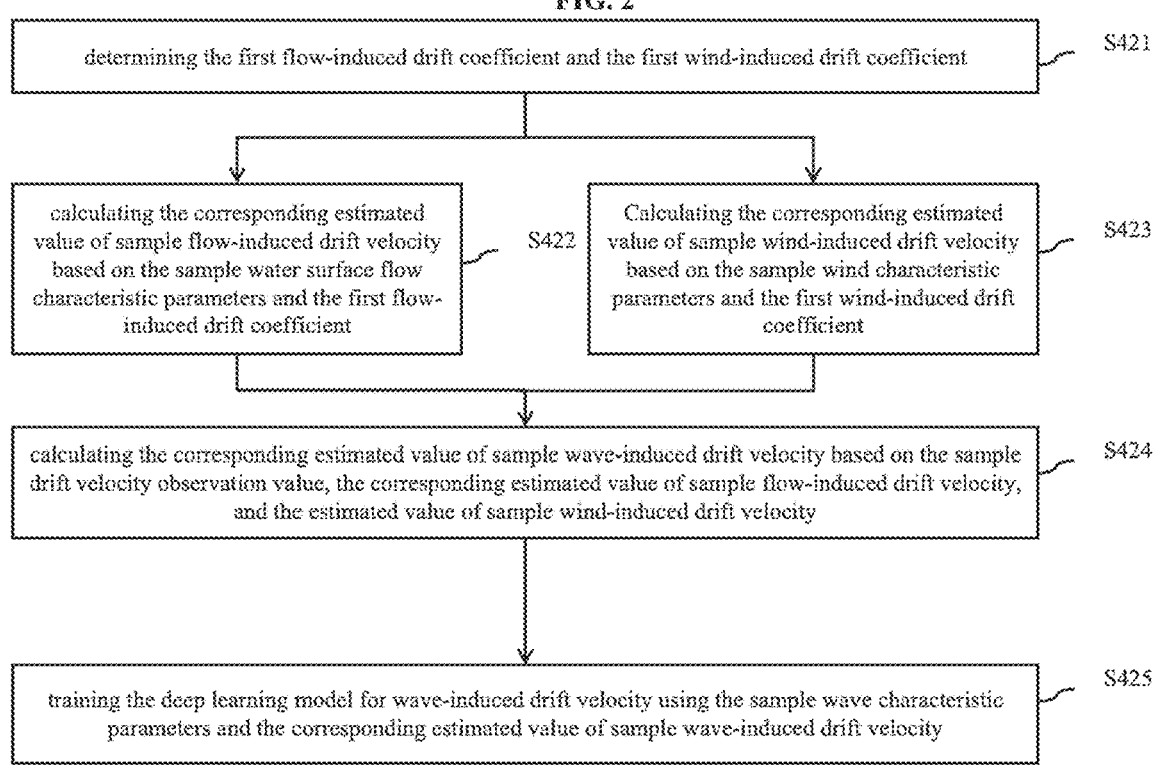
FIG. 3 shows the training method flowchart for the deep learning model for wave-induced drift velocity provided in some embodiments of the present disclosure.

FIG. 3 depicts a flowchart of the method for training the deep learning model for wave-induced drift velocity in some embodiments of the present disclosures. As shown in FIG. 3, in some embodiments of the present disclosure, training a deep learning model for wave-induced drift velocity based on the first sample drift data in the step S420 may include steps S421-S425.

Step S421: Determining the first flow-induced drift coefficient and the first wind-induced drift coefficient.

The first flow-induced drift coefficient characterizes the coefficient of the influence of water surface flow on the drift velocity of floating objects, and the first wind-induced drift coefficient characterizes the coefficient of the influence of wind on the drift velocity of floating objects.

In the embodiments of the present disclosure, the computing equipment may directly use flow-induced and wind-induced drift coefficients provided by various technical literature or related software products as the first flow-induced drift coefficient and the first wind-induced drift coefficient.

In other embodiments of the present disclosure, when the computing equipment determines the first flow-induced drift coefficient and the first wind-induced drift coefficient by executing the step S421, it may specifically determining the first flow-induced drift coefficient and the first wind-induced drift coefficient based on the sample drift velocity observation values, sample water surface flow characteristic parameters, and sample wind characteristic parameters of the first sample drift data.

In the embodiments of the present disclosure, determining the first flow-induced drift coefficient and the first wind-induced drift coefficient based on sample drift velocity observation values, sample water surface flow characteristic parameters, and sample wind characteristic parameters of the first sample drift data includes taking the sample drift velocity observation values as an approximation of the sum of the flow-induced drift velocity and the wind-induced drift velocity, and fitting the first flow-induced drift coefficient and the first wind-induced drift coefficient.

Based on the previous description, a formula $$\begin{cases} V_{ox-s} \approx V_{F-surface-current-sx} + L_{sx} \\ V_{oy-s} \approx V_{F-surface-current-sy} + L_{sy} \end{cases}$$

can be constructed in specific applications according to the previous text to establish an approximate relationship between the sample drift velocity observation values, flow-induced drift velocity, and wind-induced drift velocity. Here, $V_{ox-s}$ and $V_{oy-s}$ represent the components of the sample drift velocity observation values in the x and y axes (where the x axis can be the latitude direction and the y axis can be the longitude direction), $V_{F-surface-current-sx}$ and $V_{F-surface-current-sy}$ represent the components of the flow-induced drift velocity of the sample floating object in the x and y axes, respectively, and $L_{sx}$ and $L_{sy}$ represent the components of the wind-induced drift velocity of the sample floating object in the x and y axes, respectively.

By combining the relationship between the flow-induced drift velocity and water surface flow characteristic parameters described above, the formula $$\begin{cases} V_{F-surface-current-sx} = \lambda_c V_{csx} \\ V_{F-surface-current-sy} = \lambda_c V_{csy} \end{cases}$$

can be used to determine $V_{F-surface-current-sx}$ and $V_{F-surface-current-sy}$. Similarly, by combining the relationship between wind-induced drift velocity and wind characteristic parameters described above, the formula $$\begin{cases} L_{sx} = L_d \sin\theta + L_c \cos\theta \\ L_{sy} = L_d \cos\theta + L_c \sin\theta \end{cases}$$

can be used to calculate and determine $L_{sx}$ and $L_{sy}$, wherein, $\vec{L}_d = a_d W_{10mwind-s} + (b_d + \varepsilon_d)$, $$\begin{cases} \vec{L}_c = \delta \vec{L}_{c+} + (1-\delta)\vec{L}_{c-} \\ \vec{L}_{c+} = a_{c+} W_{10mwind-s} + b_{c+} + \varepsilon_{c+} \\ \vec{L}_{c-} = a_{c-} W_{10mwind-s} + b_{c-} + \varepsilon_{c-} \end{cases}$$

where $W_{10mwind-s}$ represents the sample wind velocity, specifically at a height of 10 meters above the water surface.

By fitting the formulas described above utilizing the first sample drift data, the first flow-induced drift coefficient $\lambda_c$ and the first wind-induced drift coefficient $a_d$, $b_d$, $a_{c+}$, $b_{c+}$, $a_{c-}$, $b_{c-}$, $\varepsilon_d$, $\varepsilon_{c+}$, $\varepsilon_{c-}$ can be determined. Specifically, parameter fitting can be performed using the least squares method to obtain the first flow-induced drift coefficient and the first wind-induced drift coefficient described above.

Determining the first flow-induced drift coefficient and the first wind-induced drift coefficient in step S421 can include steps S4211-S4214.

Step S4211: Based on the sample wind characteristic parameters and the corresponding predicted wind-induced drift deflection in the first sample drift data, constructing an expression for wind-induced drift velocity, which includes the first wind-induced drift coefficient to be determined.

Step S4212: Based on the sample water surface flow characteristic parameters in the first sample drift data, constructing an expression for flow-induced drift velocity, which includes the first flow-induced drift coefficient to be determined.

Step S4213: Constructing an approximate equation based on the expressions for wind-induced drift velocity, flow-induced drift velocity, and the corresponding sample drift velocity observation values.

Step S4214: Performing parameter fitting based on the approximate equation corresponding to the first sample drift data to obtaining the first flow-induced drift coefficient and the first wind-induced drift coefficient.

It should be noted that in order to accurately determine the first flow-induced drift coefficient and the first wind-induced drift coefficient, it is necessary to determine the deflection of the sample drift direction relative to the sample wind direction, that is, to determine the values of $\delta$ described above. Thus, in some specific embodiments of the present disclosure, before performing the step S421 described above, a step can also be performed: determining the wind-induced drift deflection corresponding to each first sample drift data, wherein the drift deflection is the deflection of the wind-induced drift direction of the sample floating objects relative to the wind direction.

In some embodiments of the present disclosure, the sample water surface flow characteristic parameters, sample wind characteristic parameters, and sample wave characteristic parameters of the first sample drift data can be input into a pre-trained deep learning model for wind-induced drift deflection to determine the corresponding wind-induced drift deflection. The deep learning model for wind-induced drift deflection is trained based on the second sample drift data, which includes the observed wind-induced drift deflection of the sample floating objects, the corresponding sample water surface flow characteristic parameters, sample wind characteristic parameters, and sample wave characteristic parameters.

In other embodiments of the present disclosure, the wind-induced drift velocity and wind direction in the first sample drift data can be used to determine the predicted wind-induced drift deflection. In a specific application, the wind-induced drift velocity can be obtained by subtracting the water surface flow velocity from the sample drift velocity observation values in the first sample drift data. Subsequently, the wind-induced drift deflection is determined as left or right deviation based on the direction of the wind-induced drift velocity and the wind direction.

It should also be noted that in the embodiment of the present disclosure, wave-induced drift velocity has not been considered when using the method described above.

Step S422: Based on the sample water surface flow characteristic parameters and the first flow-induced drift coefficient, calculating the corresponding estimated value of sample flow-induced drift velocity.

Calculating the estimated value of sample flow-induced drift velocity in Step S422 includes obtaining the estimated value of sample flow-induced drift velocity by multiplying the first flow-induced drift coefficient by the sample water surface flow velocity according to the calculation formula mentioned in Step S421.

Step S423: Calculating the corresponding estimated value of sample wind-induced drift velocity based on the sample wind characteristic parameters and the first wind-induced drift coefficient.

Calculating the estimated value of sample wind-induced drift velocity in Step S423 includes obtaining the estimated value of sample wind-induced drift velocity by calculating the first wind-induced drift coefficient with the sample wind characteristic parameters according to the calculation formula mentioned in Step S421.

Step S424: Based on the sample drift velocity observation value, the corresponding estimated value of sample flow-induced drift velocity, and the estimated value of sample wind-induced drift velocity, calculating the corresponding estimated value of sample wave-induced drift velocity.

After obtaining the estimated value of sample flow-induced drift velocity and the estimated value of sample wind-induced drift velocity, it can obtain the estimated value of sample wave-induced drift velocity by subtracting the estimated value of sample flow-induced drift velocity and the estimated value of sample wind-induced drift velocity from the sample drift velocity observation value in the Step S424.

Step S425: Training the deep learning model for wave-induced drift velocity using the sample wave characteristic parameters and the corresponding estimated value of sample wave-induced drift velocity.

After obtaining the estimated value of sample wave-induced drift velocity, the sample wave parameters and corresponding estimated value of sample wave-induced drift velocity are used as training samples to train deep learning model for wave-induced drift velocity.

The deep learning model for wave-induced drift velocity can be any possible model known in the field, such as BP neural network model, recurrent neural network model, etc., without specific limitations in the embodiments of the present disclosure.

Specifically, in order to train and obtain the optimal deep learning model for wave-induced drift velocity used finally, multiple pre-constructed deep learning models can be established in the embodiments of the present disclosure, and each deep learning model can be trained separately. It can determine the deep learning model for wave-induced drift velocity used finally based on the quality of the training results.

For example, the pre-constructed deep learning model can be a model that takes wave height from sample wave characteristic parameters as model inputs, a model that takes wave height and wave period from sample wave characteristic parameters as model inputs, and a model that takes wave height, wave period, and wave direction from sample wave characteristic parameters as model inputs.

By using the deep learning model for wave-induced drift velocity provided in the embodiments of the present disclosure, first flow-induced drift coefficient and the first wind-induced drift coefficient may be determined and the estimated values of sample flow-induced drift velocity and sample wind-induced drift velocity are calculated based on the first flow-induced drift coefficient and the first wind-induced drift coefficient. Subsequently, the estimated value of sample wave-induced drift velocity is calculated based on the sample drift velocity observation value, the estimated value of sample flow-induced drift velocity, and the estimated value of sample wind-induced drift velocity. After obtaining the estimated value of sample wave-induced drift velocity, the deep learning model for wave-induced drift velocity is trained using the estimated value of sample wave-induced drift velocity and sample wave characteristic parameters, and the implicit causal relationship between wave-induced drift velocity and wave characteristic parameters may be explored through the deep learning model without considering constructing a physical model for wave-induced drift velocity.

The method for training wave-induced drift velocity deep learning model provided in the embodiments of the present disclosure can be used to train a deep learning model for wave-induced drift velocity for predicting wave-induced drift velocity, thereby improving the accuracy of drift velocity prediction for floating objects.

Figure 4:
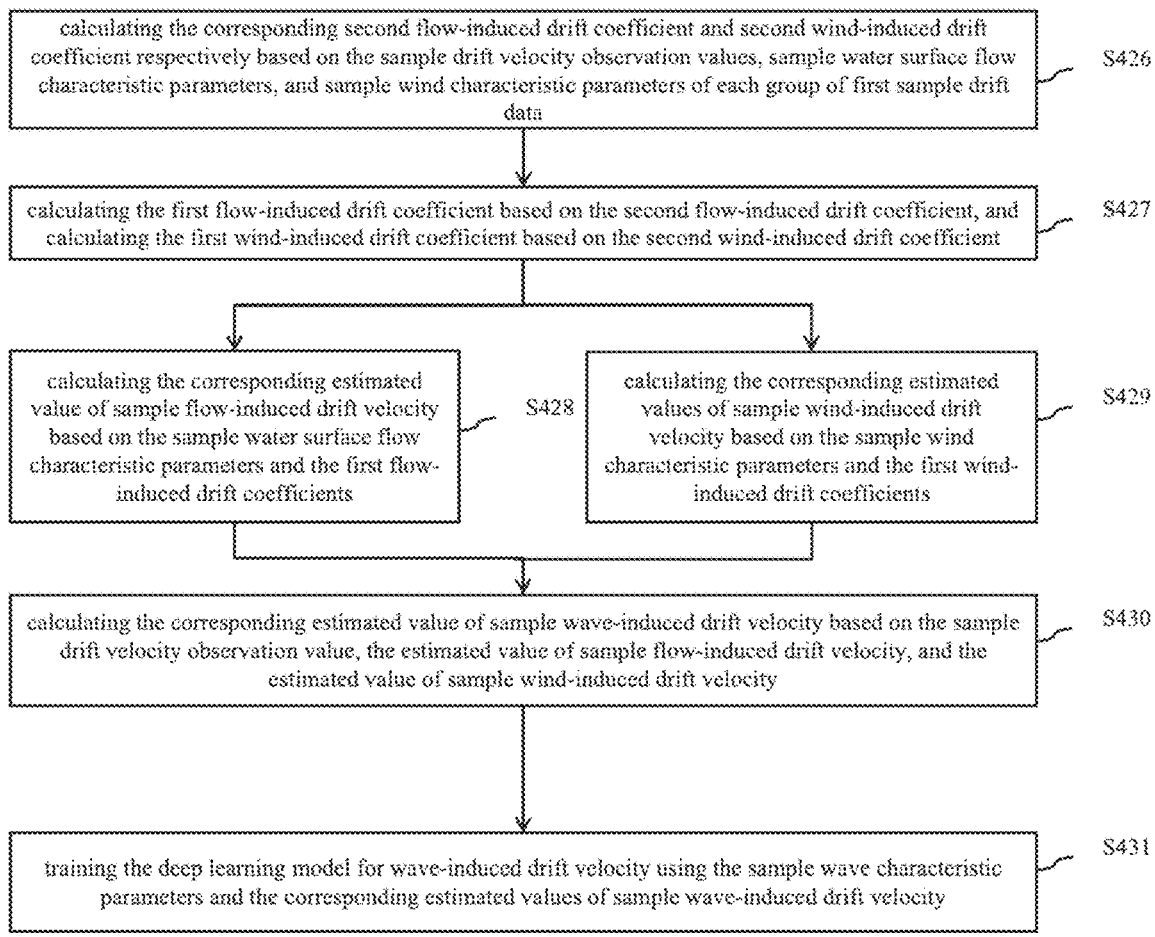
FIG. 4 shows the training method flowchart for the deep learning model for wave-induced drift velocity provided in other embodiments of the present disclosure.

FIG. 4 illustrates a flowchart of the method for training the deep learning model for wave-induced drift velocity in other embodiments of the present disclosure. As shown in FIG. 4, in other embodiments of the present disclosure, the number of first sample drift data used to train the deep learning model for wave-induced drift velocity is multiple groups, with each group containing multiple first sample drift data. The corresponding method for training the model includes steps S426-S431.

Step S426: Based on the sample drift velocity observation values, sample water surface flow characteristic parameters, and sample wind characteristic parameters of each group of first sample drift data, calculating the corresponding second flow-induced drift coefficient and second wind-induced drift coefficient.

In the embodiments of the present disclosure, each group of first sample drift data can be drift data collected within continuous time periods. In some embodiments of the present disclosure, it can obtain a large amount of first sample drift data by sampling over a longer period of time. Subsequently, a sample sliding window can be used to sample the sampling data over the longer period of time to obtain each group of first sample drift data.

In the embodiments of the present disclosure, calculating the corresponding second flow-induced drift coefficient and second wind-induced drift coefficient based on the sample drift velocity observation values, sample water surface flow characteristic parameters, and sample wind characteristic parameters of each group of first sample drift data can includes steps S4261-S4264.

Step S4261: Constructing an expression for wind-induced drift velocity based on the sample wind characteristics parameters and the corresponding predicted wind-induced drift deflection in the first sample drift data of each group, which includes the second wind-induced drift coefficient to be determined.

Step S4262: Constructing an expression for flow-induced drift velocity based on the sample water surface flow characteristics parameters in the first sample drift data of each group, which includes the second flow-induced drift coefficient to be determined.

Step S4263: Constructing an approximation equation based on the expression for wind-induced drift velocity, the expression for flow-induced drift velocity, and the corresponding sample drift velocity observation value.

Step S4264: Performing parameter fitting based on the approximation equations corresponding to the first sample drift data of each group, and obtaining the second flow-induced drift coefficient and second wind-induced drift coefficient corresponding to the first sample drift data of each group.

Step S427: Calculating the first flow-induced drift coefficient based on the second flow-induced drift coefficient, and calculating the first wind-induced drift coefficient based on the second wind-induced drift coefficient.

In the embodiments of the present disclosure, after obtaining multiple second flow-induced drift coefficients, each second flow-induced drift coefficient can be used to calculate the first flow-induced drift coefficient.

In the embodiments of the present disclosure, the average value of multiple second flow-induced drift coefficients can be calculated as the first flow-induced drift coefficient.

In other embodiments of the present disclosure, steps S4271-S4274 can be used to calculate the first flow-induced drift coefficient based on the second flow-induced drift coefficients.

Step S4271: Calculating the average value and standard deviation of the second flow-induced drift coefficients.

For example, if the second flow-induced drift coefficients are $\lambda_{c1}, \lambda_{c2}, \ldots, \lambda_{cn}$, then the corresponding average value is $$\overline{\lambda_c} = \frac{\lambda_{c1} + \lambda_{c2} + \ldots + \lambda_{cn}}{n}$$

and the standard deviation is $$\sigma_c = \sqrt{\frac{\sum_{i=1}^{n}(\lambda_{ci} - \overline{\lambda})^2}{n}}.$$

Step S4272: Based on the average value and standard deviation of the second flow-induced drift coefficients, determining whether the distribution characteristics of multiple second flow-induced drift coefficients satisfy the first preset condition. Based on that the distribution characteristics of multiple second flow-induced drift coefficients satisfy the first preset condition, proceed to Step S4273; based on that the distribution characteristics of multiple second flow-induced drift coefficients do not satisfy the first preset condition, proceed to Step S4274.

The first preset condition is determined by the average value and standard deviation of the second flow-induced drift coefficients. The first preset condition is an interval range determined by m standard deviations centered on the average value of the second flow-induced drift coefficients. In a specific application, m can be set to 3.

Step S4273: determining the average value of multiple second flow-induced drift coefficients as the first flow-induced drift coefficient.

Step S4274: filtering multiple second flow-induced drift coefficients based on the first preset condition and obtaining the filtered second flow-induced drift coefficients, and repeating the Steps S4271 to S4274 until the distribution characteristics of the filtered second flow-induced drift velocities satisfy the first preset condition.

If the distribution characteristics of the second flow-induced drift coefficients do not satisfy the first preset condition, it may filter the second flow-induced drift coefficients based on the first preset condition, i.e., remove the second flow-induced drift coefficients that are outside the range of the first preset condition. Subsequently, it may filter the remaining second flow-induced drift coefficients following the method described above until they all satisfy the first preset condition.

By following Steps S4271 to S4274 as described above, the obtained first flow-induced drift coefficient can better represent the impact of water flow on drift velocity in actual environmental conditions.

Similar to the method for calculating the first flow-induced drift coefficient as described above, in some embodiments of the present disclosure, calculating the first wind-induced drift coefficient based on the second wind-induced drift coefficients may include steps S4275-S4278.

Step S4275: Calculating the average value and standard deviation of the second wind-induced drift coefficients.

Step S4276: Based on the average value and standard deviation of the second wind-induced drift coefficients, determining whether the distribution characteristics of multiple second wind-induced drift coefficients satisfy the second preset conditions; based on that the distribution characteristics of multiple second wind-induced drift coefficients satisfy the second preset conditions, proceed to step S4277; based on that the distribution characteristics of multiple second wind-induced drift coefficients do not satisfy the second preset conditions, proceed to step S4278.

Step S4277: based on that the distribution characteristics of multiple second wind-induced drift coefficients satisfy the second preset conditions, taking the average value of the multiple second wind-induced drift coefficients as the first wind-induced drift coefficient.

Step S4278: filtering the multiple second wind-induced drift coefficients based on the second preset condition to obtain the filtered second wind-induced drift coefficients, and repeating steps S4275-S4278 until the distribution characteristics of the filtered second wind-induced drift coefficients satisfy the second preset conditions.

It should be noted that in some specific applications of the present disclosure, it can perform the steps S4275-S4278 described above for each parameter in the second wind-induced drift coefficients until all parameters satisfy the specified conditions. In other embodiments of the present disclosure, the steps S4275-S4278 described above may be performed for parameters with significant impact in the second wind-induced drift coefficients, such as only using steps S4275-S4278 to calculate $a_d$, $a_{c+}$, and $a_{c-}$.

Step S428: Calculating the corresponding estimated value of sample flow-induced drift velocity based on the sample water surface flow characteristic parameters and the first flow-induced drift coefficients.

Step S429: Calculating the corresponding estimated values of sample wind-induced drift velocity based on the sample wind characteristic parameters and the first wind-induced drift coefficients.

Step S430: Calculating the corresponding estimated value of sample wave-induced drift velocity based on the sample drift velocity observation value, the estimated value of sample flow-induced drift velocity, and the estimated value of sample wind-induced drift velocity.

Step S431: Training the deep learning model for wave-induced drift velocity using the sample wave characteristic parameters and the corresponding estimated values of sample wave-induced drift velocity.

The execution process of the Steps S428-S431 described above is the same as Steps S422-S425, and will not be repeated here. For details, please refer to the previous description.

By employing the Steps S426 and S427 described above, multiple groups of second flow-induced drift coefficients and second wind-induced drift coefficients are calculated using multiple groups of first sample drift data. And the first flow-induced drift coefficient and first wind-induced drift coefficient are obtained based on the multiple groups of second flow-induced drift coefficients and second wind-induced drift coefficients. Thus, it ensures that the first flow-induced drift coefficient and first wind-induced drift coefficient better reflect actual environmental conditions, thereby improving the accuracy of the subsequent estimated values of sample wind-induced drift velocity, sample flow-induced drift velocity, and sample wave-induced drift velocity. Furthermore, it enhances the accuracy of the data obtained from the subsequent training of the deep learning model for wave-induced drift velocity, leading to a more precise representation of actual conditions and a more accurate prediction of wave-induced drift velocity.

Figure 5:
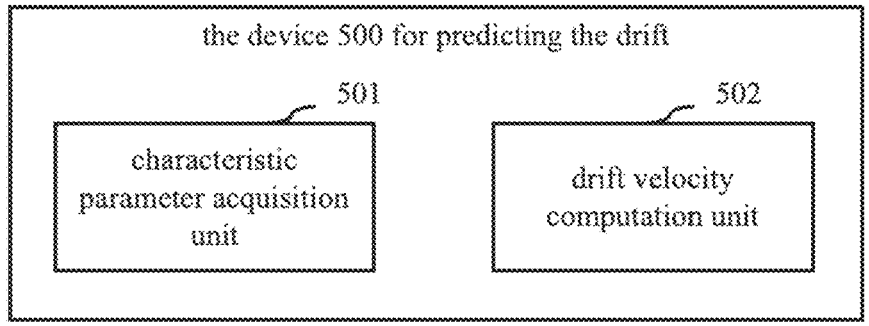
FIG. 5 shows the schematic diagram of the structure of the floating object drift prediction device provided in some embodiments of the present disclosure.

In addition to providing the method for predicting the drift velocity of floating objects described above, the embodiments of the present disclosure also provide a device 500 for predicting the drift of the floating objects. FIG. 5 is a schematic diagram of the structure of the device 500 for predicting the drift of the floating objects provided in the embodiments of the present disclosure. As shown in FIG. 5, the device 500 for predicting the drift of the floating objects includes a characteristic parameter acquisition unit 501 and a drift velocity computation unit 502.

The characteristic parameter acquisition unit 501 is used to acquire environmental characteristic parameters at the location of the floating object to be predicted, which include wave characteristic parameters.

The drift velocity computation unit 502 is used to input the wave characteristic parameters into a pre-trained deep learning model for wave-induced drift velocity to obtain the wave-induced drift velocity.

The deep learning model for wave-induced drift velocity is trained based on the first sample drift data, which includes sample drift velocity observation values of sample floating objects and corresponding sample water surface flow characteristic parameters, sample wind characteristic parameters, and sample wave characteristic parameters.

In the embodiments of the present disclosure, the environmental characteristic parameters also include water surface flow characteristic parameters and wind characteristic parameters. The drift velocity computation unit 502 is also used to calculate flow-induced drift velocity based on the water surface flow characteristic parameters, and to calculate wind-induced drift velocity based on the wind characteristic parameters, as well as to calculate the predicted drift velocity of the floating object to be predicted based on the flow-induced drift velocity, wind-induced drift velocity, and wave-induced drift velocity.

In the embodiments of the present disclosure, the drift velocity computation unit 502 calculates the flow-induced drift velocity based on the water surface flow characteristic parameters and the first flow-induced drift coefficient, and calculates the wind-induced drift velocity based on the wind characteristic parameters and the first wind-induced drift coefficient. The first flow-induced drift coefficient and the first wind-induced drift coefficient are determined during the process of training the deep learning model for wave-induced drift velocity based on the first sample drift data.

In the embodiments of the present disclosure, the device 500 for predicting the drift may also include a deflection determination unit. The deflection determination unit is used to determine the predicted wind-induced drift deflection of the floating object to be predicted based on the environmental characteristic parameters, where the predicted wind-induced drift deflection represents deflection of the drift direction of the floating object to be predicted perpendicular to the wind direction.

The drift velocity computation unit 502 is used to select the corresponding first wind-induced drift coefficient based on the predicted wind-induced drift deflection.

In some embodiments of the present disclosure, the deflection determination unit inputs the environmental characteristic parameters into a pre-trained deep learning model for wind-induced drift deflection to determine the predicted drift deflection of the floating object to be predicted, wherein the deep learning model for wind-induced drift deflection is trained based on the second sample drift data, which includes observed wind-induced drift deflection of sample floating objects and corresponding environmental characteristic parameters.

In the embodiments of the present disclosure, the wave characteristic parameters include at least one of wave height, wave period, and wave direction; the water surface flow characteristic parameters include the flow velocity and flow direction of the surface water; and the wind characteristic parameters include wind velocity and wind direction.

In the embodiments of the present disclosure, the device 500 for predicting the drift also includes a model simulation unit and an environmental characteristic parameter determination unit. The model simulation unit is used to determine a sea condition simulation model based on observed sea condition data; the environmental characteristic parameter determination unit is used to perform numerical simulation based on the sea condition simulation model to determine the environmental characteristic parameters at the location and time of the floating object to be predicted.

Figure 6:
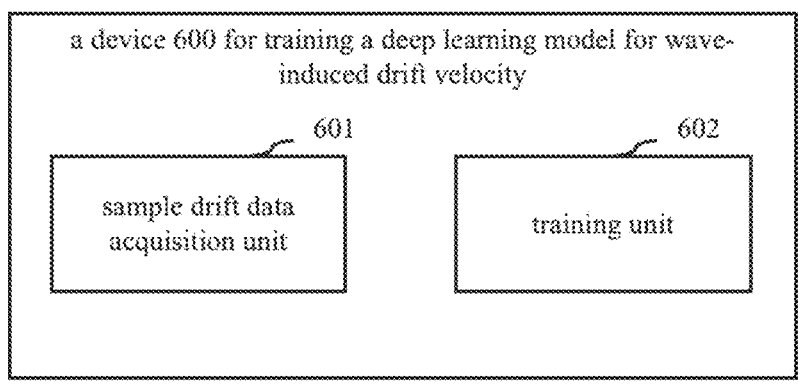
FIG. 6 shows the schematic diagram of the structure of the training device for the deep learning model for wave-induced drift velocity provided in some embodiments of the present disclosure.

The embodiments of the present disclosure also provide a device 600 for training a deep learning model for wave-induced drift velocity. FIG. 6 shows a schematic diagram of the structure of the device for training the deep learning model for wave-induced drift velocity provided in the embodiments of the present disclosure. As shown in FIG. 6, the device 600 for training deep learning model for wave-induced drift velocity includes a sample drift data acquisition unit 601 and a training unit 602.

The sample drift data acquisition unit 601 is used to obtain multiple first sample drift data, where the first sample drift data includes sample drift velocity observation values of the sample floating object, corresponding sample water surface flow characteristic parameters, sample wind characteristic parameters, and sample wave characteristic parameters.

The training unit 602 is used to train a deep learning model for wave-induced drift velocity based on the first sample drift data.

In some embodiments of the present disclosure, the training unit 602 includes a first drift coefficient determination sub-unit, an estimated sample drift velocity determination sub-unit, and a model training sub-unit.

The first drift coefficient determination sub-unit is used to determine the first flow-induced drift coefficient and the first wind-induced drift coefficient.

The estimated sample drift velocity determination sub-unit is used to calculate the corresponding estimated sample flow-induced drift velocity based on the sample water surface flow characteristic parameters and the first flow-induced drift coefficient, calculate the corresponding estimated sample wind-induced drift velocity based on the sample wind characteristic parameters and the first wind-induced drift coefficient and calculate the corresponding estimated sample wave-induced drift velocity based on the sample drift velocity observation value, the estimated sample flow-induced drift velocity, and the estimated sample wind-induced drift velocity.

The model training sub-unit is used to train the deep learning model for wave-induced drift velocity using sample wave characteristic parameters and corresponding estimated sample wave-induced drift velocity.

In some embodiments of the present disclosure, there are multiple groups of the first sample drift data, and each group of the first sample drift data contains multiple instances of first sample drift data. The first drift coefficient determination sub-unit includes a second drift coefficient computation module and a first drift coefficient computation module.

The second drift coefficient computation module is used to calculate the corresponding second flow-induced drift coefficient and second wind-induced drift coefficient based on the sample drift velocity observation values, sample water surface flow characteristic parameters, and sample wind characteristic parameters of each group of the first sample drift data respectively.

The first drift coefficient computation module is used to calculate the first flow-induced drift coefficient based on the second flow-induced drift coefficients, and to calculate the first wind-induced drift coefficient based on the second wind-induced drift coefficients.

In some embodiments of the present disclosure, the first drift coefficient computation module includes steps A-D for calculating the first flow-induced drift coefficient based on the second flow-induced drift coefficients.

A. Calculating the average value and standard deviation of the second flow-induced drift coefficients;

B. Based on the average value and standard deviation of the second flow-induced drift coefficients, determining whether the distribution characteristics of multiple second flow-induced drift coefficients satisfy the first preset condition;

C. Based on that the distribution characteristics of multiple second flow-induced drift coefficients satisfy the first preset condition, taking the average value of multiple second flow-induced drift coefficients as the first flow-induced drift coefficient;

D. Based on that the distribution characteristics of multiple second flow-induced drift coefficients do not satisfy the first preset condition, filtering the multiple second flow-induced drift coefficients according to the first preset condition to obtain filtered second flow-induced drift coefficients, and re-executing the steps A-D until the distribution characteristics of the screened second flow-induced drift coefficients satisfy the first preset condition.

In some embodiments of the present disclosure, the first drift coefficient computation module includes steps E-H for calculating the first wind-induced drift coefficient based on the second wind-induced drift coefficients.

E. Calculating the average value and standard deviation of the second wind-induced drift coefficients;

F. Based on the average value and standard deviation of the second wind-induced drift coefficients, determining whether the distribution characteristics of multiple second wind-induced drift coefficients satisfy the second preset condition;

G. Based on that the distribution characteristics of multiple second wind-induced drift coefficients satisfy the second preset condition, taking the average value of multiple second wind-induced drift coefficients as the first wind-induced drift coefficient;

H. Based on that the distribution characteristics of multiple second wind-induced drift coefficients do not satisfy the second preset condition, filtering the multiple second wind-induced drift coefficients according to the second preset condition to obtain the filtered second wind-induced drift coefficients, and re-executing steps E-H until the distribution characteristics of the screened second wind-induced drift coefficients satisfy the second preset condition.

In the embodiments of the present disclosure, the device 600 for training a deep learning model for wave-induced drift velocity also includes a wind-induced drift deflection computation unit. The wind-induced drift deflection computation unit is used to determine the wind-induced drift deflection corresponding to each first sample drift data, where the wind-induced drift deflection represents the deflection of the wind-induced drift direction of the sample drift object relative to the sample wind direction.

Correspondingly, the second drift coefficient computation module calculates the second flow-induced drift coefficients and the second wind-induced drift coefficients based on the sample drift velocity observation values in each group of first sample drift data, the corresponding sample water surface flow characteristic parameters, sample wind characteristic parameters, and the drift deflection.

In the embodiments of the present disclosure, the wind-induced drift deflection computation unit inputs the water surface flow characteristic parameters, wind characteristic parameters, and wave characteristic parameters of the first sample drift data into a pre-trained deep learning model for wind-induced drift deflection to determine the corresponding wind-induced drift deflection.

The deep learning model for wind-induced drift deflection is trained based on the second sample drift data, which includes observed wind-induced drift deflection values of sample floating drifters, along with their corresponding water surface flow characteristic parameters, wind characteristic parameters, and wave characteristic parameters.

In the embodiments of the present disclosure, calculating, by the second drift coefficient computation module, the second flow-induced drift coefficient and the second wind-induced drift coefficient includes: constructing a flow-induced drift velocity expression based on the water surface flow characteristic parameters of each group of first sample drift data, wherein the flow-induced drift velocity expression includes the second flow-induced drift coefficient to be determined; constructing a wind-induced drift velocity expression based on the wind characteristic parameters of each group of first sample drift data, wherein the wind-induced drift velocity expression includes the second wind-induced drift coefficient to be determined; constructing an approximate equation based on the wind-induced drift velocity expression, the flow-induced drift velocity expression, and corresponding observed drift velocity values; performing parameter fitting based on the approximate equation corresponding to each group of first sample drift data to calculate and obtain the second flow-induced drift coefficient and the second wind-induced drift coefficient corresponding to each group of first sample drift data.

The device provided in the embodiment can execute the method for predicting drift of the floating objects or the method for training the deep learning model for wave-induced drift velocity, with similar execution and beneficial effects, which are not further elaborated here.

The embodiments of the present disclosure also provide a computing equipment that includes a processor and a memory, where the memory stores a computer program.

When the computer program is executed by the processor, it can implement the methods of any of the embodiments shown in FIGS. 1-4.

Figure 7:
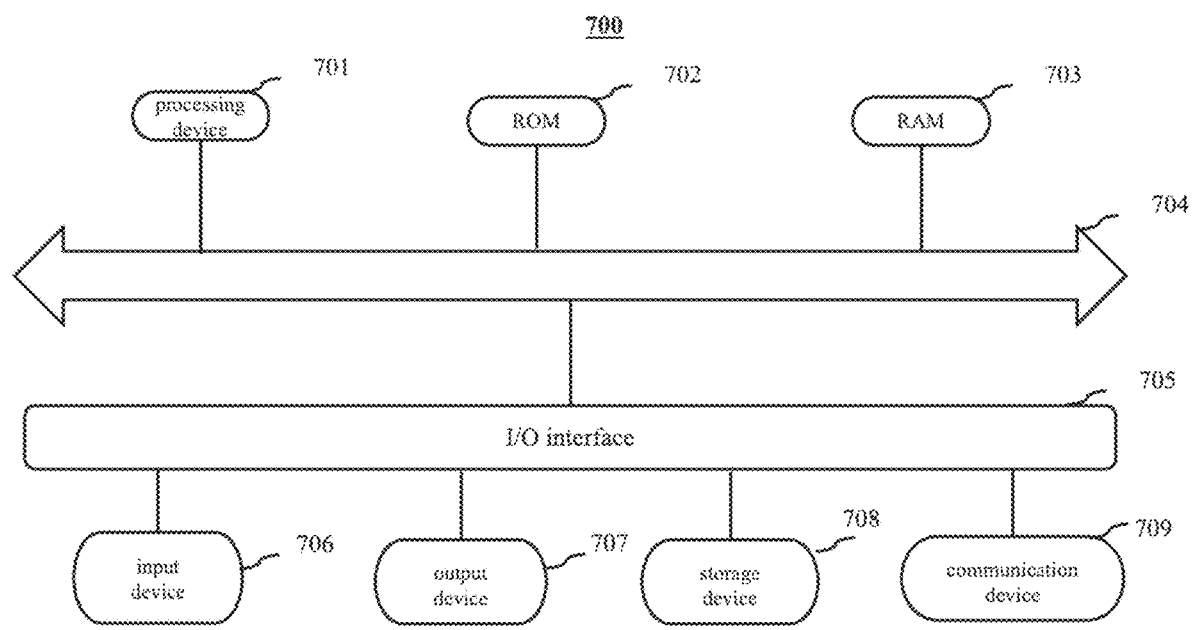
FIG. 7 shows a schematic diagram of the structure of a computing equipment in some embodiments of the present disclosure.

For example, FIG. 7 illustrates a schematic diagram of a computing equipment in the embodiments of the present disclosure. The computing equipment 700 in the embodiments of the present disclosure can include, but is not limited to, mobile terminals such as mobile phones, laptops, digital radio receivers, PDAs (personal digital assistants), PAD (portable android device), PMPs (portable media player), car terminals (e.g., car navigation terminals), as well as fixed terminals such as digital TVs, desktop computers, and so on. The computing equipment shown in FIG. 7 is just an example and should not impose any restrictions on the functionality and scope of use of this disclosed embodiment.

As shown in FIG. 7, the computing equipment 700 may include a processing unit 701 (such as a central processing unit, graphics processing unit, etc.), which can perform various appropriate actions and processes based on programs stored in read-only memory (ROM) 702 or loaded from storage device 708 into random access memory (RAM) 703. In RAM 703, various programs and data required for the operation of computing equipment 700 are also stored. The processing unit 701, ROM 702, and RAM 703 are interconnected via bus 704. An input/output (I/O) interface 705 is also connected to bus 704.

Typically, the following devices can be connected to I/O interface 705: input devices 706 such as touch screens, touchpads, keyboards, mice, cameras, microphones, accelerometers, gyroscopes, etc.; output devices 707 such as liquid crystal displays (LCDs), speakers, vibrators, etc.; storage devices 708 such as tapes, hard drives, etc.; and communication devices 709. Communication device 709 allows computing equipment 700 to wirelessly or wired communicate with other devices to exchange data. While FIG. 7 shows computing equipment 700 with various devices, it should be understood that it is not required to implement or have all the devices shown. Alternatively, more or fewer devices can be implemented or included.

In particular, based on the disclosed embodiments, the process described in the preceding flowchart can be implemented as a computer software program. For example, the disclosed embodiments include a computer program product comprising computer program code stored on a non-transitory computer-readable medium, the computer program containing instructions for executing the methods depicted in the flowchart. In such embodiments, the computer program can be downloaded and installed from the network via communication device 709, or installed from storage device 708, or installed from ROM 702. When the computer program is executed by processing unit 701, the functionalities specified in the methods of the disclosed embodiments are carried out.

It should be noted that the computer-readable medium disclosed above can be a computer-readable signal medium, a computer-readable storage medium, or any combination of the two. Computer-readable storage media may include, but are not limited to, electrical, magnetic, optical, electromagnetic, infrared, or semiconductor systems, devices, or apparatus, or any combination thereof. More specific examples of computer-readable storage media may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices, non-volatile storage device or any suitable combination of the above. In this disclosure, computer-readable storage media can be any tangible medium containing or storing programs that can be used by instruction execution systems, devices, or apparatus, or in conjunction with them. In this disclosure, computer-readable signal media may include data signals propagated in baseband or as part of a carrier, carrying computer-readable program code. These propagated data signals can take various forms, including, but not limited to, electromagnetic signals, optical signals, or any suitable combination of the above. Computer-readable signal media may also be any computer-readable medium other than computer-readable storage media, which can transmit, propagate, or transport programs for use by instruction execution systems, devices, or apparatus or in conjunction with them. Program code contained on computer-readable media can be transmitted using any appropriate medium, including, but not limited to: wires, optical cables, RF (radio frequency), and so on, or any suitable combination of the above.

In some embodiments, clients and servers can communicate using any currently known or future developed network protocols such as HTTP (HyperText Transfer Protocol) and can interconnect with digital data in any form or medium (e.g., communication networks). Examples of communication networks include local area networks ("LANs"), wide area networks ("WANs"), the Internet, end-to-end networks (e.g., ad hoc end-to-end networks), and any currently known or future developed networks.

The computer-readable media mentioned above can be included in the computing devices mentioned or can exist separately, not integrated into the computing devices.

The aforementioned computer-readable medium carries one or more programs. When one or more of these programs are executed by the computing equipment, the computing equipment may obtain environmental characteristic parameters at the location of the floating object to be predicted. The environmental characteristic parameters include water surface flow characteristic parameters, wind characteristic parameters, and wave characteristic parameters. Based on the water surface flow characteristic parameters, the computing equipment calculates the flow-induced drift velocity, and based on the wind characteristic parameters, the computing equipment calculates the wind-induced drift velocity. And the computing equipment can obtain the wave-induced drift velocity by using a pre-trained deep learning model for wave-induced drift velocity processing the wave characteristic parameters. The deep learning model for wave-induced drift velocity is trained based on first sample drift data, which includes sample drift velocity observation values of sample floating objects and corresponding sample water surface flow characteristic parameters, sample wind characteristic parameters, and sample wave characteristic parameters.

Computer program code for executing the disclosed operations can be written in one or more programming languages or their combinations. These programming languages include but are not limited to object-oriented programming languages such as Java, Smalltalk, C++, as well as conventional procedural programming languages such as "C" language or similar programming languages. The program code can be executed entirely on a user's computer, partially on a user's computer, as a standalone software package, partially on a user's computer and partially on a remote computer, or entirely on a remote computer or server. In cases involving remote computers, the remote computer can be connected to the user's computer via any type of network, including local area network (LAN) or wide area network (WAN), or can be connected to external computers (e.g., via the internet through an internet service provider).

The flowcharts and block diagrams in the figures illustrate the system architecture, functionality, and operations of various embodiments of the system, method, and computer program product as disclosed herein. Each block in the flowchart or block diagram may represent a module, program segment, or part of code, which includes executable instructions for implementing specified logical functions. It should also be noted that in some alternative implementations, the functions indicated in the blocks may occur in a different order than what is depicted in the figures. For example, two blocks shown in sequence may actually be executed substantially in parallel, or they may sometimes be executed in the reverse order, depending on the functions involved. Additionally, each block in the block diagram and/or flowchart, as well as the combination of blocks in the block diagram and/or flowchart, can be implemented using specialized hardware-based systems to perform the specified functions or operations, or can be implemented using a combination of specialized hardware and computer instructions.

The units described in the embodiments disclosed herein can be implemented through software or hardware means. The name of the unit does not necessarily limit the unit itself in certain situations.

The functions described above in this document can be at least partially performed by one or more hardware logic components. For example, non-limiting examples of hardware logic components that can be used include: Field-Programmable Gate Arrays (FPGAs), Application-Specific Integrated Circuits (ASICs), Application-Specific Standard Products (ASSPs), System-on-Chip (SoC), Complex Programmable Logic Devices (CPLDs), and so on.

In the context of this disclosure, a machine-readable medium can be a tangible medium that may contain or store programs for use by instruction execution systems, devices, or equipment, or in conjunction with instruction execution systems, devices, or equipment. Machine-readable media can be machine-readable signal media or machine-readable storage media. Machine-readable media may include but are not limited to electronic, magnetic, optical, electromagnetic, infrared, or semiconductor systems, devices, or equipment, or any suitable combination thereof. More specific examples of machine-readable storage media may include electrical connections based on one or more wires, portable computer disks, hard drives, random access memory (RAM), read-only memory (ROM), erasable programmable read-only memory (EPROM or flash memory), optical fibers, portable compact disc read-only memory (CD-ROM), optical storage devices, magnetic storage devices, or any suitable combination of the above.

This disclosure also provides a computer-readable storage medium that stores computer programs, which when executed by a processor, can implement the methods of any one of the embodiments in FIGS. 1-4, with similar execution and beneficial effects, which are not further elaborated here.

It should be noted that in this document, relational terms such as "first" and "second" are used solely to distinguish one entity or operation from another, without necessarily implying any actual relationship or order between these entities or operations. Additionally, terms such as "including" "comprising" or any other variations are intended to encompass non-exclusive inclusion, so that a process, method, item, or device that includes a series of elements includes not only those elements explicitly listed, but also other elements not explicitly listed or inherent to the process, method, item, or device. Unless further limited, an element specified by the phrase "including . . . " does not exclude the presence of additional identical elements in the process, method, item, or device that includes the element.

The above are specific embodiments of this disclosure to enable those skilled in the art to understand or implement the disclosure. Various modifications to these embodiments will be readily apparent to those skilled in the art, and the general principles defined herein can be implemented in other embodiments without departing from the spirit or scope of the disclosure. Therefore, this disclosure is not limited to the embodiments described herein, but is intended to encompass the broadest scope consistent with the principles and novel features disclosed herein.

What is claimed is:

1. A method for predicting a drift velocity, comprising:
    obtaining environmental characteristic parameters at a location of a floating object to be predicted, wherein the environmental characteristic parameters comprise wave characteristic parameters;
    obtaining a wave-induced drift velocity by inputting the wave characteristic parameters into a deep learning model for the wave-induced drift velocity;
    wherein the deep learning model for the wave-induced drift velocity is trained based on first sample drift data, wherein the first sample drift data comprises a sample drift velocity observation value of sample floating objects and corresponding sample water surface flow characteristic parameters, sample wind characteristic parameters, and sample wave characteristic parameters;
    wherein a step of training the deep learning model for the wave-induced drift velocity based on the first sample drift data comprises:
    taking the sample drift velocity observation values as an approximation of a sum of a flow-induced drift velocity and a wind-induced drift velocity, fitting a first flow-induced drift coefficient and a first wind-induced drift coefficient, and simultaneously determining the first flow-induced drift coefficient and the first wind-induced drift coefficient;
    calculating a corresponding estimated value of a sample flow-induced drift velocity based on the sample water surface flow characteristic parameters and the first flow-induced drift coefficient, and calculating a corresponding estimated value of a sample wind-induced drift velocity based on the sample wind characteristic parameters and the first wind-induced drift coefficient;
    calculating a corresponding estimated value of a sample wave-induced drift velocity based on the sample drift velocity observation value, the corresponding estimated value of the sample flow-induced drift velocity, and the corresponding estimated value of the sample wind-induced drift velocity;
    training the deep learning model for the wave-induced drift velocity using the sample wave characteristic parameters and the corresponding estimated value of the sample wave-induced drift velocity.

2. The method according to claim 1, wherein the environmental characteristic parameters further comprise water surface flow characteristic parameters and wind characteristic parameters; the method further comprises:
    calculating the flow-induced drift velocity based on the water surface flow characteristic parameters, and calculating the wind-induced drift velocity based on the wind characteristic parameters; and calculating a predicted drift velocity of the floating object to be predicted based on the flow-induced drift velocity, the wind-induced drift velocity, and the wave-induced drift velocity.

3. The method according to claim 2, wherein
a step of calculating the flow-induced drift velocity based on the water surface flow characteristic parameters comprises calculating the flow-induced drift velocity based on the water surface flow characteristic parameters and the first flow-induced drift coefficient; and
a step of calculating the wind-induced drift velocity based on the wind characteristic parameters comprises calculating the wind-induced drift velocity based on the wind characteristic parameters and the first wind-induced drift coefficient;
wherein the first flow-induced drift coefficient and the first wind-induced drift coefficient are determined during a training process of the deep learning model for the wave-induced drift velocity based on the first sample drift data.

4. The method according to claim 3, wherein prior to a step of calculating the wind-induced drift velocity based on the wind characteristic parameters and the first wind-induced drift coefficient, the method further comprises:
determining a predicted wind-induced drift deflection based on the environmental characteristic parameters; and
selecting a corresponding first wind-induced drift coefficient based on the predicted wind-induced drift deflection.

5. The method according to claim 4, wherein a step of determining the predicted wind-induced drift deflection based on the environmental characteristic parameters comprises:
determining the predicted wind-induced drift deflection by inputting the environmental characteristic parameters into a deep learning model for a wind-induced drift deflection;
wherein the deep learning model for the wind-induced drift deflection is trained based on second sample drift data, the second sample drift data comprises observed values of a wind-induced drift deflection of the sample floating objects and corresponding environmental characteristic parameters.

6. The method according to claim 2, wherein the wave characteristic parameters comprise at least one of a wave height, a wave period, and a wave direction;
the water surface flow characteristic parameters comprise a flow velocity and direction of a water surface flow; and
the wind characteristic parameters comprise a wind velocity and a wind direction.

7. The method according to claim 1, wherein a step of obtaining the environmental characteristic parameters at the location of the floating object to be predicted comprises:
determining a sea condition simulation model based on observed sea condition data; and
performing a numerical simulation based on the sea condition simulation model to determine the environmental characteristic parameters at the location and time of the floating object to be predicted.

8. A method for training a deep learning model for a wave-induced drift velocity, comprising:
obtaining multiple groups of first sample drift data, wherein the first sample drift data comprises sample drift velocity observation values of sample floating objects and corresponding sample environmental characteristic parameters, wherein the sample environmental characteristic parameters comprise sample water surface flow characteristic parameters, sample wind characteristic parameters, and sample wave characteristic parameters;
training the deep learning model for the wave-induced drift velocity based on the first sample drift data;
wherein a step of training the deep learning model for the wave-induced drift velocity based on the first sample drift data comprises:
taking the sample drift velocity observation values as an approximation of a sum of a flow-induced drift velocity and a wind-induced drift velocity, fitting a first flow-induced drift coefficient and a first wind-induced drift coefficient, and determining the first flow-induced drift coefficient and the first wind-induced drift coefficient;
calculating a corresponding estimated value of a sample flow-induced drift velocity based on the sample water surface flow characteristic parameters and the first flow-induced drift coefficient, and calculating a corresponding estimated value of a sample wind-induced drift velocity based on the sample wind characteristic parameters and the first wind-induced drift coefficient;
calculating a corresponding estimated value of a sample wave-induced drift velocity based on the sample drift velocity observation value, the corresponding estimated value of the sample flow-induced drift velocity, and the corresponding estimated value of the sample wind-induced drift velocity;
training the deep learning model for the wave-induced drift velocity using the sample wave characteristic parameters and the corresponding estimated value of the sample wave-induced drift velocity.

9. The method according to claim 8, wherein there are multiple groups of the first sample drift data, and each group of the first sample drift data comprises multiple data;
a step of simultaneously determining the first flow-induced drift coefficient and the first wind-induced drift coefficient comprises:
calculating a second flow-induced drift coefficient and a second wind-induced drift coefficient based on the sample drift velocity observation values, the sample water surface flow characteristic parameters, and the sample wind characteristic parameters in each group of the first sample drift data, wherein the second flow-induced drift coefficient and the second wind-induced drift coefficient are determined at an equal time; and
calculating the first flow-induced drift coefficient based on the second flow-induced drift coefficient, and calculating the first wind-induced drift coefficient based on the second wind-induced drift coefficient.

10. The method according to claim 9, wherein a step of calculating the first flow-induced drift coefficient based on the second flow-induced drift coefficient comprises:
calculating an average value and standard deviation of the second flow-induced drift coefficient;
based on the average value and standard deviation of the second flow-induced drift coefficient, determining whether distribution characteristics of multiple second flow-induced drift coefficients satisfy a first preset condition;
based on that the distribution characteristics of the multiple second flow-induced drift coefficients satisfy the first preset condition, taking an average value of the multiple second flow-induced drift coefficients as the first flow-induced drift coefficient; and based on that the distribution characteristics of the multiple second flow-induced drift coefficients do not satisfy the first preset condition, filtering the multiple second flow-induced drift coefficients according to the first preset condition, and obtaining filtered second flow-induced drift coefficients, and re-executing until the distribution characteristics of screened second flow-induced drift coefficients satisfy the first preset condition.

11. The method according to claim 9, wherein a step of calculating the first wind-induced drift coefficient based on the second wind-induced drift coefficient comprises:
calculating an average value and standard deviation of the second wind-induced drift coefficient;
based on the average value and standard deviation of the second wind-induced drift coefficient, determining whether distribution characteristics of multiple second wind-induced drift coefficients satisfy a second preset condition;
based on that the distribution characteristics of the multiple second wind-induced drift coefficients satisfy the second preset condition, taking the average value of the multiple second wind-induced drift coefficients as the first wind-induced drift coefficient; and
based on that the distribution characteristics of the multiple second wind-induced drift coefficients do not satisfy the second preset condition, filtering the multiple second wind-induced drift coefficients according to the second preset condition, and obtaining filtered second wind-induced drift coefficients, and re-executing until the distribution characteristics of the filtered second wind-induced drift coefficients satisfy the second preset condition.

12. The method according to claim 9, wherein prior to a step of calculating the second flow-induced drift coefficient and the second wind-induced drift coefficient based on the sample drift velocity observation values, the sample water surface flow characteristic parameters, and the sample wind characteristic parameters in each group of the first sample drift data, the method further comprises:
determining a wind-induced drift deflection of each group of the first sample drift data, wherein the wind-induced drift deflection is a deflection of a wind-induced drift direction of the sample floating objects relative toa wind direction;
based on the sample drift velocity observation values, the sample water surface flow characteristic parameters, and the sample wind characteristic parameters in each group of the first sample drift data, calculating the second flow-induced drift coefficient and the second wind-induced drift coefficient, comprising:
based on the sample drift velocity observation values in each group of the first sample drift data, the sample water surface flow characteristic parameters, the sample wind characteristic parameters, and the wind-induced drift deflection, calculating the second flow-induced drift coefficient and the second wind-induced drift coefficient.

13. The method according to claim 12, wherein a step of determining the wind-induced drift deflection of each group of the first sample drift data comprises:
inputting environmental characteristic parameters of the first sample drift data into a deep learning model for the wind-induced drift deflection to determine a corresponding wind-induced drift deflection;
wherein the deep learning model for the wind-induced drift deflection is trained based on second sample drift data, the second sample drift data comprises the drift velocity observation values of the sample floating objects and corresponding environmental characteristic parameters; or
determining an estimated wind-induced drift velocity based on the sample water surface flow characteristic parameters and the drift velocity observation values;
determining the wind-induced drift deflection based on the estimated wind-induced drift velocity and wind characteristic parameters.

14. The method according to claim 13, wherein a step of calculating the second flow-induced drift coefficient and the second wind-induced drift coefficient based on the sample drift velocity observation values, the sample water surface flow characteristic parameters, and the sample wind characteristic parameters in each group of the first sample drift data comprises:
based on the sample wind characteristic parameters and corresponding wind-induced drift deflection in each group of the first sample drift data, constructing a wind-induced drift velocity expression, wherein the wind-induced drift velocity expression comprises a second wind-induced drift coefficient to be determined;
based on sample water surface flow characteristic parameters in each group of the first sample drift data, constructing a flow-induced drift velocity expression, wherein the flow-induced drift velocity expression comprises the second flow-induced drift coefficient to be determined;
based on the wind-induced drift velocity expression, flow-induced drift velocity expression, and corresponding sample drift velocity observation values, constructing an approximate equation; and
based on approximate equations corresponding to each group of the first sample drift data, performing parameter fitting to calculate the second flow-induced drift coefficient and the second wind-induced drift coefficient in each group of the first sample drift data.

15. A computing equipment, comprising:
a memory and a processor, wherein the memory stores a computer program, when the computer program is executed by the processor, causing the processor:
obtaining environmental characteristic parameters at a location of a floating object to be predicted, wherein the environmental characteristic parameters comprise wave characteristic parameters;
obtaining a wave-induced drift velocity by inputting the wave characteristic parameters into a deep learning model for the wave-induced drift velocity;
wherein the deep learning model for the wave-induced drift velocity is trained based on first sample drift data, wherein the first sample drift data comprises a sample drift velocity observation value of sample floating objects and corresponding sample water surface flow characteristic parameters, sample wind characteristic parameters, and sample wave characteristic parameters;
wherein a step of training the deep learning model for the wave-induced drift velocity based on the first sample drift data comprises:
taking the sample drift velocity observation values as an approximation of a sum of a flow-induced drift velocity and a wind-induced drift velocity, fitting a first flow-induced drift coefficient and a first wind-induced drift coefficient, and simultaneously determining the first flow-induced drift coefficient and the first wind-induced drift coefficient;

calculating a corresponding estimated value of a sample flow-induced drift velocity based on the sample water surface flow characteristic parameters and the first flow-induced drift coefficient, and calculating a corresponding estimated value of a sample wind-induced drift velocity based on the sample wind characteristic parameters and the first wind-induced drift coefficient;

calculating a corresponding estimated value of a sample wave-induced drift velocity based on the sample drift velocity observation value, the corresponding estimated value of the sample flow-induced drift velocity, and the corresponding estimated value of the sample wind-induced drift velocity;

training the deep learning model for the wave-induced drift velocity using the sample wave characteristic parameters and the corresponding estimated value of the sample wave-induced drift velocity.

16. The computing equipment according to claim 15, wherein the environmental characteristic parameters further comprise water surface flow characteristic parameters and wind characteristic parameters; the computer program executed by the processor, causing the processor:

calculating the flow-induced drift velocity based on the water surface flow characteristic parameters, and calculating the wind-induced drift velocity based on the wind characteristic parameters; and calculating a predicted drift velocity of the floating object to be predicted based on the flow-induced drift velocity, the wind-induced drift velocity, and the wave-induced drift velocity.

17. The computing equipment according to claim 16, wherein a step of calculating the flow-induced drift velocity based on the water surface flow characteristic parameters comprises calculating the flow-induced drift velocity based on the water surface flow characteristic parameters and the first flow-induced drift coefficient; and a step of calculating the wind-induced drift velocity based on the wind characteristic parameters comprises calculating the wind-induced drift velocity based on the wind characteristic parameters and the first wind-induced drift coefficient;

wherein the first flow-induced drift coefficient and the first wind-induced drift coefficient are determined during a training process of the deep learning model for the wave-induced drift velocity based on the first sample drift data.

18. The computing equipment according to claim 17, wherein prior to a step of calculating the wind-induced drift velocity based on the wind characteristic parameters and the first wind-induced drift coefficient, the computer program executed by the processor, causing the processor:

determining a predicted wind-induced drift deflection based on the environmental characteristic parameters; and selecting a corresponding first wind-induced drift coefficient based on the predicted wind-induced drift deflection.

19. The computing equipment according to claim 18, wherein a step of determining the predicted wind-induced drift deflection based on the environmental characteristic parameters comprises:

determining the predicted wind-induced drift deflection by inputting the environmental characteristic parameters into a deep learning model for a wind-induced drift deflection;

wherein the deep learning model for the wind-induced drift deflection is trained based on second sample drift data, the second sample drift data comprises observed values of a wind-induced drift deflection of the sample floating objects and corresponding environmental characteristic parameters.

20. The computing equipment according to claim 16, wherein the wave characteristic parameters comprise at least one of a wave height, a wave period, and a wave direction;

the water surface flow characteristic parameters comprise a flow velocity and direction of a water surface flow; and the wind characteristic parameters comprise a wind velocity and a wind direction.

* * * * *